United States Patent
Han et al.

(10) Patent No.: US 10,397,905 B2
(45) Date of Patent: *Aug. 27, 2019

(54) METHOD AND APPARATUS FOR TRANSMITTING UPLINK CONTROL INFORMATION IN A WIRELESS COMMUNICATION SYSTEM

(71) Applicant: LG ELECTRONICS INC., Seoul (KR)

(72) Inventors: Seung Hee Han, Anyang-si (KR); Jae Hoon Chung, Anyang-si (KR); Sung Ho Moon, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

This patent is subject to a terminal disclaimer.

(21) Appl. No.: 15/584,807

(22) Filed: May 2, 2017

(65) Prior Publication Data
US 2017/0238309 A1 Aug. 17, 2017

Related U.S. Application Data

(63) Continuation of application No. 14/485,252, filed on Sep. 12, 2014, now Pat. No. 9,686,777, which is a (Continued)

(30) Foreign Application Priority Data

Jan. 7, 2011 (KR) .................... 10-2011-0001871

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/0073* (2013.01); *H04L 1/1671* (2013.01);
(Continued)

(58) Field of Classification Search
CPC .......... H04W 72/0413; H04W 72/0466; H04L 1/0073; H04L 1/1671; H04L 1/1896;
(Continued)

(56) References Cited

U.S. PATENT DOCUMENTS

2008/0200196 A1    8/2008   Muharemovic et al.
2008/0298488 A1*  12/2008   Shen ................. H04W 72/0406
                                                              375/260
(Continued)

FOREIGN PATENT DOCUMENTS

CN     101502034     8/2009
CN     101606338     12/2009
(Continued)

OTHER PUBLICATIONS

The State Intellectual Property Office of the People's Republic of China Application Serial No. 201180010087.5, Office Action dated Jun. 30, 2014, 5 pages.

(Continued)

*Primary Examiner* — Obaidul Huq
(74) *Attorney, Agent, or Firm* — Lee Hong Degerman Kang Waimey

(57) ABSTRACT

The present invention provides a method and apparatus for transmitting uplink control information (UCI) by user equipment in a wireless communication. The user equipment performs channel coding on information bits of the UCI to generate encoding information bits; performs modulation on the thus generated encoding information bits to generate complex modulation symbols; spreads the complex modulation symbols block-wise to a plurality of single carrier-
(Continued)

frequency division multiple access (SC-FDMA) symbols based on an orthogonal sequence; and transmits the spread complex modulation symbols to a base station.

14 Claims, 35 Drawing Sheets

Related U.S. Application Data continuation of application No. 13/522,487, filed as application No. PCT/KR2011/000197 on Jan. 12, 2011, now Pat. No. 8,867,469.

(60) Provisional application No. 61/320,775, filed on Apr. 5, 2010, provisional application No. 61/305,966, filed on Feb. 19, 2010, provisional application No. 61/298,550, filed on Jan. 27, 2010, provisional application No. 61/298,553, filed on Jan. 27, 2010, provisional application No. 61/295,741, filed on Jan. 17, 2010.

(51) Int. Cl.
*H04L 1/00* (2006.01)
*H04L 1/16* (2006.01)
*H04L 1/18* (2006.01)

(52) U.S. Cl.
CPC .......... *H04L 1/1896* (2013.01); *H04L 5/001* (2013.01); *H04L 5/0019* (2013.01); *H04L 5/0053* (2013.01); *H04L 5/0055* (2013.01); *H04W 72/0466* (2013.01); *H04L 1/0026* (2013.01); *H04L 1/0031* (2013.01)

(58) Field of Classification Search
CPC ..... H04L 5/001; H04L 5/0019; H04L 5/0053; H04L 5/0055; H04L 1/0026; H04L 1/0031
USPC ................................ 370/310, 328, 329, 335
See application file for complete search history.

(56) References Cited

U.S. PATENT DOCUMENTS

| 2009/0175159 A1 | 7/2009 | Bertrand et al. |
| 2009/0196229 A1 | 8/2009 | Shen et al. |
| 2011/0141928 A1* | 6/2011 | Shin ............... H04L 1/0028 370/252 |
| 2015/0003379 A1 | 1/2015 | Han et al. |

FOREIGN PATENT DOCUMENTS

| CN | 101617489 | 12/2009 |
| CN | 101939937 | 1/2011 |
| WO | 2008151228 | 12/2008 |

OTHER PUBLICATIONS

Ericsson, et al., "A/N transmission in the uplink for carrier aggregation," 3GPP TSG-RAN WG1 #59bis, R1-100044, Jan. 2010, 3 pages.
Nokia Siemens Networks, et al., "Multiplexing Capability of CQIs and ACK/NACKs form different UEs," 3GPP TSG RAN WG1 Meeting #49, R1-072315, May 2007, 4 pages.
NTT DoCoMo, et al., "On PUCCH Structure for CQI Report," 3GPP TSG RAN WG1 Meeting #51, R1-074812, Nov. 2007, 7 pages.
Ericsson, "On Multiple ACK/NAK for LTE TDD," TSG-RAN WG1 #53, R1-082001, May 2008, 5 pages.
Huawei, "PUCCH design for carrier aggregation," 3GPP TSG RAN WG1 Meeting #58bis, R1-093838, Oct. 2009, 6 pages.
Huawei, "Consideration on ACK/NACK bundling and Multi-ACK/NACK multiplexing in TDD," 3GPP TSG RAN WG1 Meeting #53, R1-081790, XP-002549272, May 2008, 5 pages.
'LTE; Evolved Universal Terrestrial Radio Access (E-UTRA); Physical channels and modulation, 3GPP TS 36.211 version 9.0.0 Release 9, XP-002723008, Dec. 2009, pp. 16-20.
European Patent Office Application Serial No. 11733048.0, Search Report dated Apr. 24, 2014, 9 pages.
State Intellectual Property Office of the People's Republic of China Application Serial No. 201510171210.1, Office Action dated Sep. 4, 2017, 8 pages.
The State Intellectual Property Office of the People's Republic of China Application Serial No. 201180010087.5, Certificate dated May 13, 2015, 62 pages.
Korean Intellectual Property Office Application No. 10-2011-0001871, Office Action dated Dec. 22, 2016, 4 pages.
European Patent Office Application Serial No. 18177148.6, Search Report dated Oct. 10, 2018, 6 pages.
Takahashi, R. et al., "Performance Comparison Between Cyclic Shift and Block Spreading CDMA Using MLD with Channel Coding Information for Uplink Control Signals", IEEE, Sep. 2009, 5 pages.

* cited by examiner

Slot

Normal CP case (a)

Slot

Extended CP case (b)

(a)

(b)

d(9) is punctured

▨ RS
☐ Data
▩ SRS

METHOD AND APPARATUS FOR TRANSMITTING UPLINK CONTROL INFORMATION IN A WIRELESS COMMUNICATION SYSTEM

CROSS-REFERENCE TO RELATED APPLICATIONS

This application is a continuation of U.S. patent application Ser. No. 14/485,252, filed on Sep. 12, 2014, now U.S. Pat. No. 9,686,777, which is a continuation of U.S. patent application Ser. No. 13/522,487, filed on Jul. 16, 2012, now U.S. Pat. No. 8,867,469, which is the National Stage filing under 35 U.S.C. 371 of International Application No. PCT/KR2011/000197, filed on Jan. 12, 2011, which claims the benefit of earlier filing date and right of priority to Korean Application No. 10-2011-0001871, filed on Jan. 7, 2011, and also claims the benefit of U.S. Provisional Application No. 61/320,775, filed on Apr. 5, 2010, 61/305,966, filed on Feb. 19, 2010, 61/298,553, filed on Jan. 27, 2010, 61/298,550, filed on Jan. 27, 2010, and 61/295,741, filed on Jan. 17, 2010, the contents of which are all hereby incorporated by reference herein in their entirety.

BACKGROUND OF THE INVENTION

Field of the Invention

The present invention relates to wireless communications, and more particularly, to a method and apparatus for transmitting uplink control information in a wireless communication system.

Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

Uplink control information (UCI) can be transmitted through a physical uplink control channel (PUCCH). The UCI can include various types of information such as a scheduling request (SR), an acknowledgement/non-acknowledgement (ACK/NACK) signal for hybrid ARQ (HARQ), a channel quality indicator (CQI), a precoding matrix indicator (PMI), a rank indicator (RI), etc. The PUCCH carries various types of control information according to a format.

There is a need for a method for effectively transmitting various types of UCI.

SUMMARY OF THE INVENTION

The present invention provides a method and apparatus for transmitting uplink control information in a wireless communication system.

In an aspect, a method for transmitting uplink control information (UCI) by a user equipment in a wireless communication system is provided. The method includes performing channel coding on information bits of the UCI to generate encoding information bits, modulating the generated encoding information bits to generate complex modulation symbols, block-wise spreading the complex modulation symbols to multiple single carrier-frequency division multiple access (SC-FDMA) symbols on the basis of an orthogonal sequence, and transmitting the spread complex modulation symbols to a base station.

Information bits of the UCI may include an information bit of first UCI and an information bit of second UCI, and channel coding may be performed by joint-coding the information bit of the first UCI and the information bit of the second UCI. The information bit of the first UCI may be an acknowledgement/non-acknowledgement (ACK/NACK) bit-stream concatenated with an ACK/NACK information bit for each of multiple serving cells, and the information bit of the second UCI may be a scheduling request (SR). The SR may be added to a last part of the ACK/NACK bit-stream. The SR may be one bit. If the SR is 1, it may indicate a presence of an SR transmission event, and if the SR is 0, it may indicate an absence of the SR transmission event.

Information bits of the UCI may be information bits of specific UCI having a higher priority according to a predetermined priority. The information bits of the UCI may be an ACK/NACK signal for multiple component carriers (CCs).

The information bits of the UCI may include a representative ACK/NACK signal which represents respective ACK/NACK information for multiple CCs.

The method may further include transmitting an uplink reference signal by using at least two SC-FDMA symbols per slot. Phase modulation with −1 may be performed on at least one uplink reference signal among uplink reference signals transmitted by using the at least two SC-FDMA symbols.

The method may further include transmitting a sounding reference signal (SRS) by using at least one SC-FDMA symbol per subframe. A length of the orthogonal code may be determined based on the number of SC-FDMA symbols for transmitting the SRS.

The orthogonal code may be any one of a Walsh code or a discrete Fourier transform (DFT) code.

In another aspect, a user equipment is provided. The user equipment includes a radio frequency (RF) unit for transmitting or receiving a radio signal, and a processor coupled to the RF unit, wherein the processor is configured for performing channel coding on information bits of uplink control information (UCI) to generate encoding information bits, modulating the generated encoding information bits to generate complex modulation symbols, and block-wise spreading the complex modulation symbols to multiple single carrier-frequency division multiple access (SC-FDMA) symbols on the basis of an orthogonal sequence.

Various types of uplink control information (UCI) can be effectively transmitted without collision when the UCI needs to be transmitted in the same subframe or the same slot.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
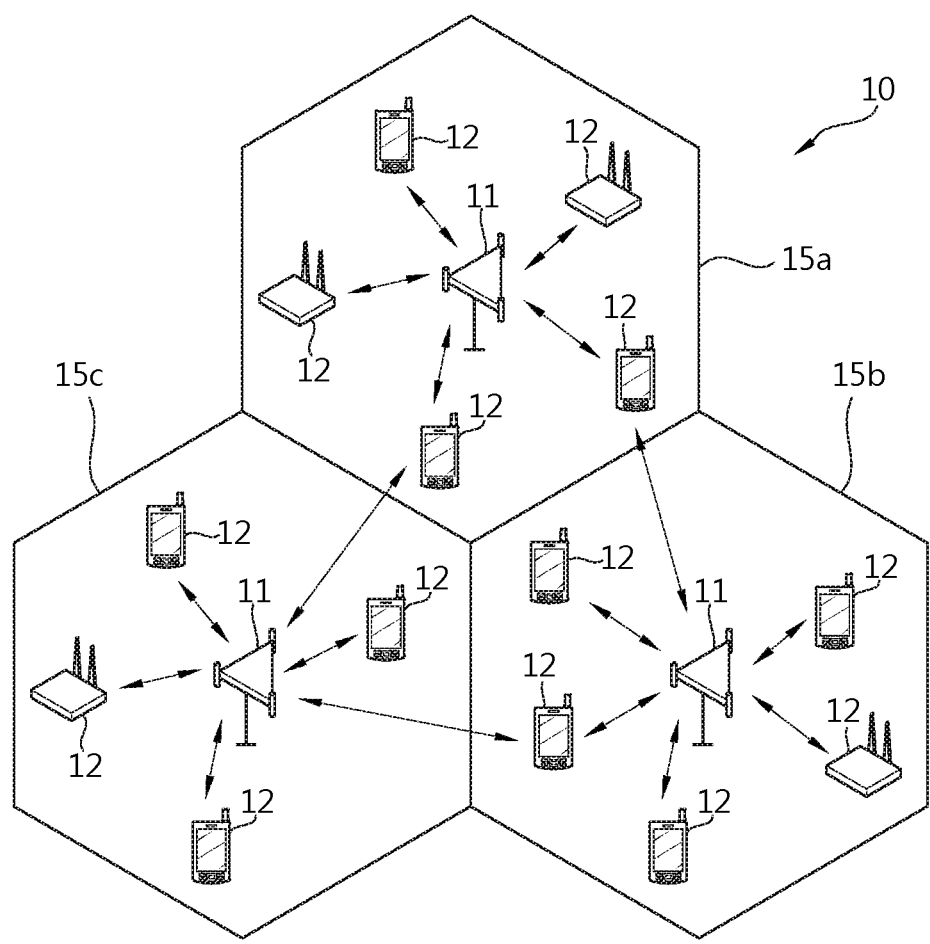
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
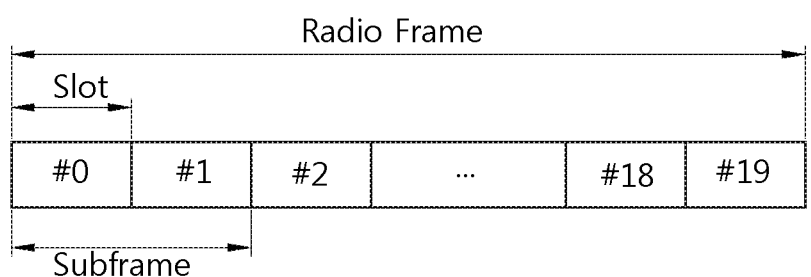
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
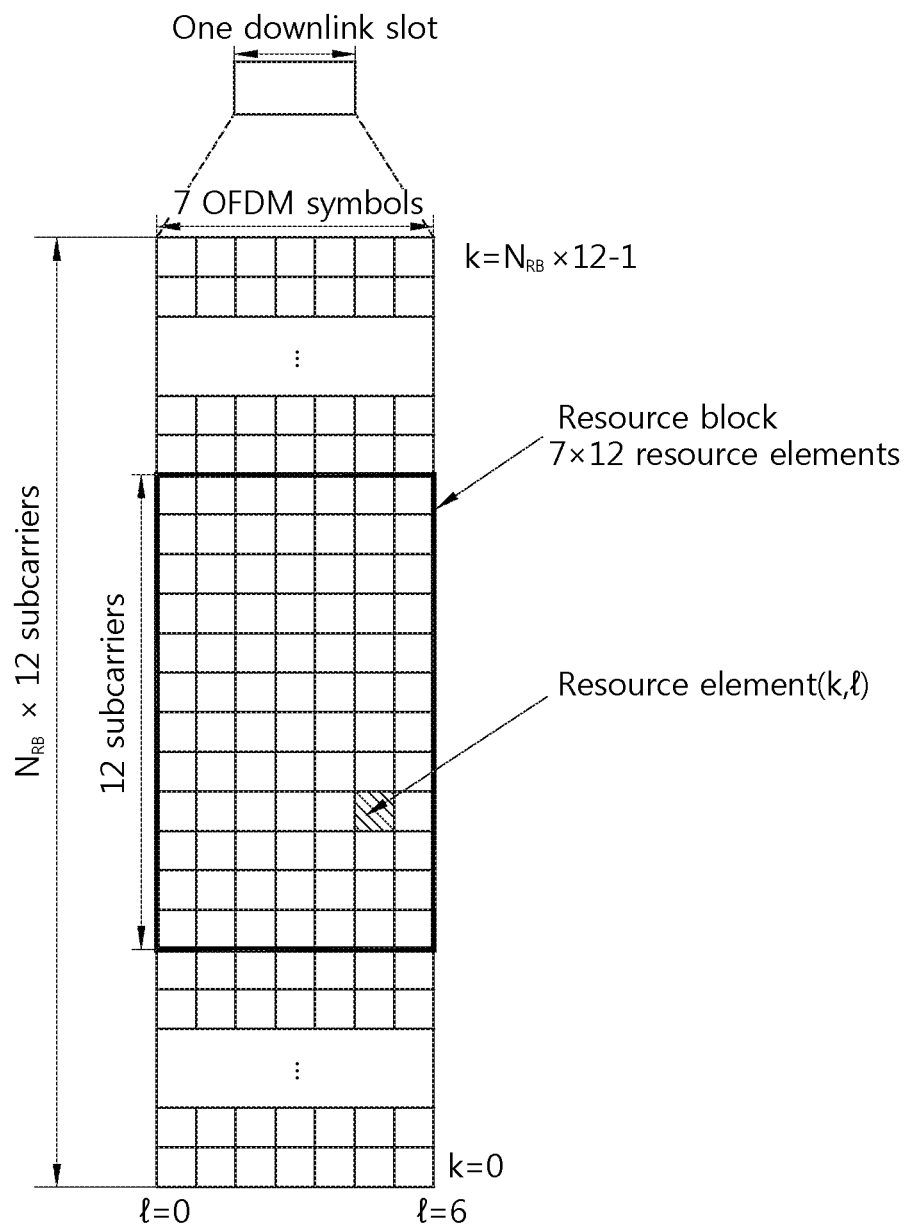
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
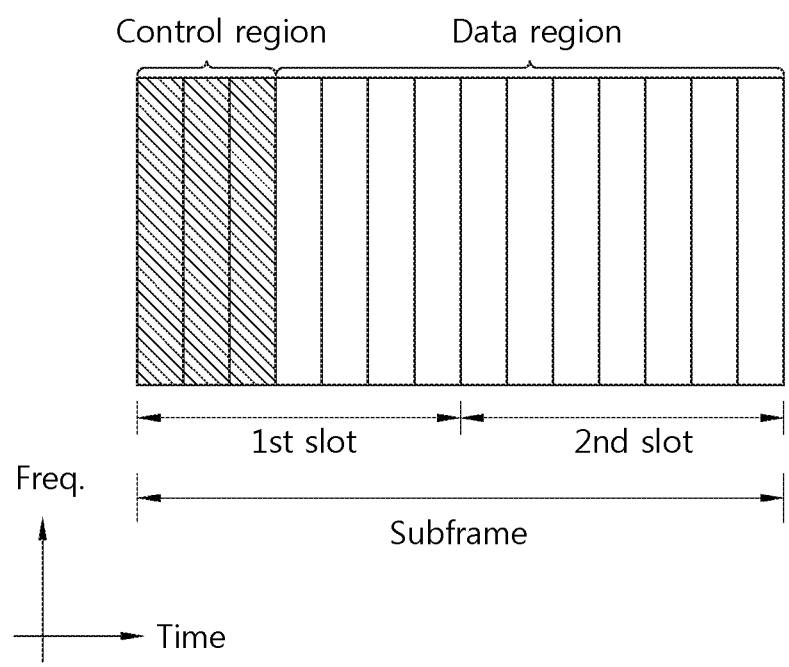
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
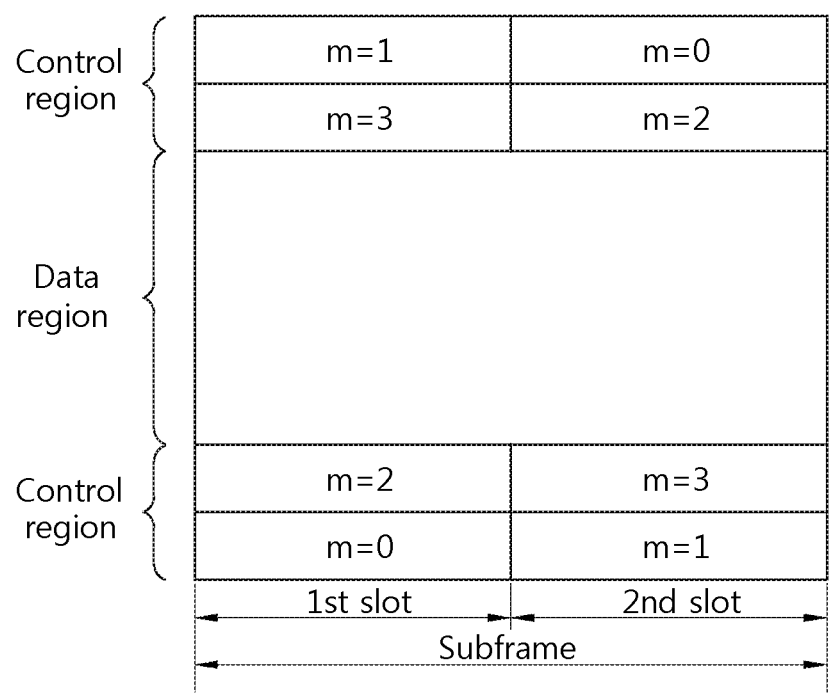
FIG. 5 shows the structure of an uplink subframe.
Figure 5:
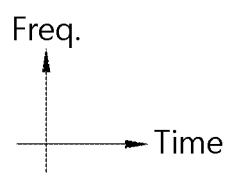

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

The PUCCH carries various types of control information according to a format. A PUCCH format 1 carries a scheduling request (SR). In this case, an on-off keying (OOK) scheme can be used. A PUCCH format 1 a carries an acknowledgement/non-acknowledgement (ACK/NACK) modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a channel quality indicator (CQI) modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | set of values for $\ell$ | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

ACK/NACK signals can be transmitted by using different resources including different cyclic shift values and different Walsh/discrete Fourier transform (DFT) orthogonal codes by using a computer generated constant amplitude zero auto correlation (CG-CAZAC) sequence for each UE. If an available cyclic shift value is 6 and the number of Walsh/DFT codes is 3, 18 UEs having a signal antenna port can be multiplexed in one PRB.

Figure 6:
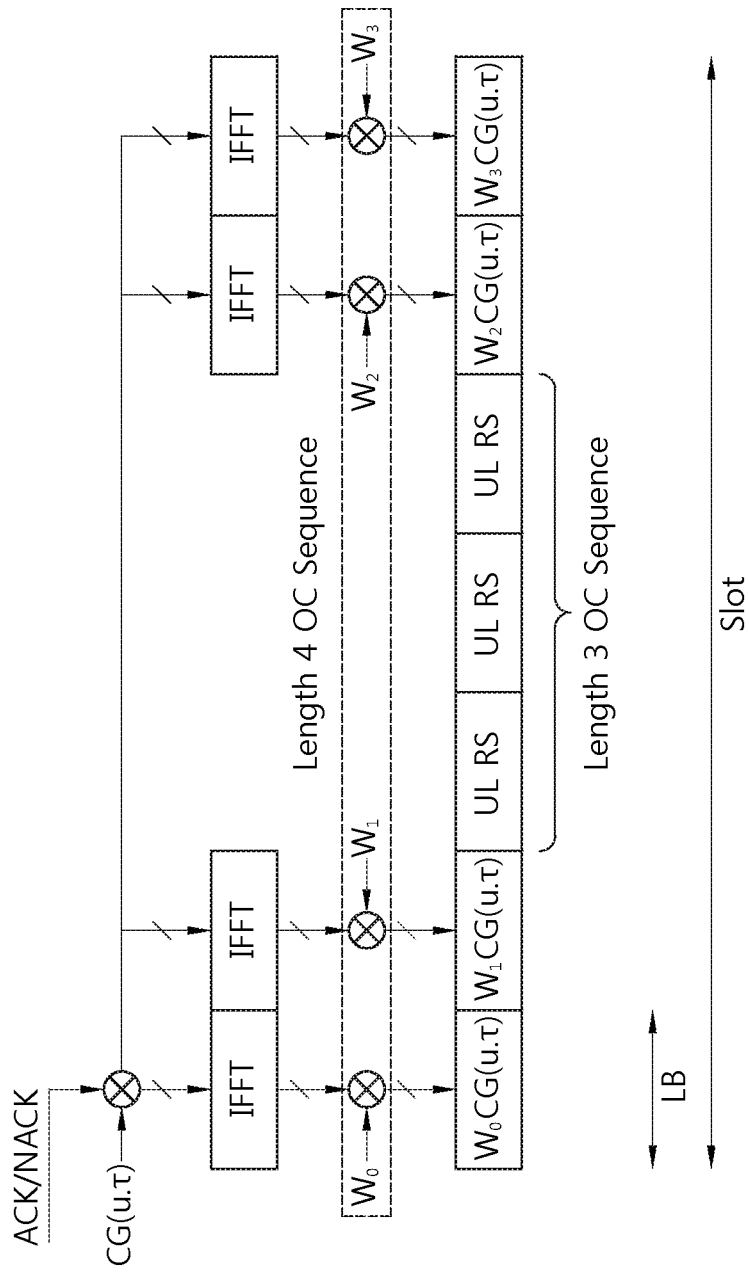
FIG. 6 shows a PUCCH format 1a/1b in a normal CP structure.

FIG. 6 shows a PUCCH format 1a/1b in a normal CP structure. Uplink reference signals are transmitted in $3^{rd}$ to $5^{th}$ SC-FDMA symbols. In FIG. 6, $w_0$, $w_1$, $w_2$ and $w_3$ can be modulated in a time domain after inverse fast Fourier transform (IFFT) modulation, or can be modulated in a frequency domain before IFFT modulation.

Figure 7:
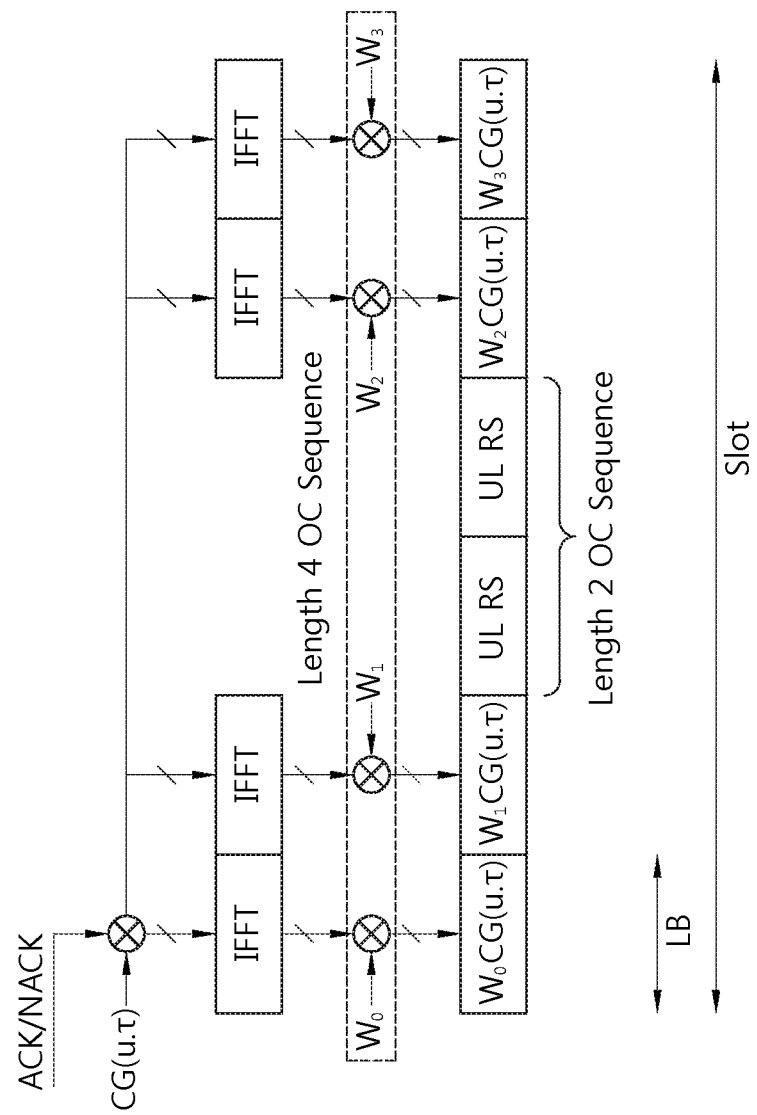
FIG. 7 shows a PUCCH format 1a/1b in an extended CP structure.

FIG. 7 shows a PUCCH format 1a/1b in an extended CP structure. Uplink reference signals are transmitted in $3^{rd}$ and $4^{th}$ SC-FDMA symbols. In FIG. 7, $w_0$, $w_1$, $w_2$ and $w_3$ can be modulated in a time domain after IFFT modulation, or can be modulated in a frequency domain before IFFT modulation.

An ACK/NACK resource including an SR, a cyclic shift assigned to the UE for persistent scheduling, a Walsh/DFT code, a PRB, or the like can be given by using RRC signaling. For non-persistent scheduling for dynamic ACK/NACK, the allocated resource can be given by a lowest CCE index of a PDCCH corresponding to a PDSCH for the ACK/NACK.

Table 4 is an example of an orthogonal sequence with a length of 4 for the PUCCH format 1/1a/1b.

TABLE 4

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 5 is an example of an orthogonal sequence with a length of 3 for the PUCCH format 1/1a/1b.

TABLE 5

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 is an example of an orthogonal sequence for reference signal transmission in the PUCCH format 1/1a/1b.

TABLE 6

| Sequence index $n_{oc2}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 7 is an example of ACK/NACK channelization when $\Delta_{shift}^{PUCCH}=2$ in a normal CP structure.

TABLE 7

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $n_{OC}' = 0$ | $n_{OC}' = 1$ | $n_{OC}' = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

In Table 7, $\Delta_{shift}^{PUCCH}=2$ is a cell-specific cyclic shift value of a CAZAC sequence, and may have any one of values 1 to 3 in a normal CP structure or an extended CP structure. $\delta_{offset}^{PUCCH}$ is a cell-specific cyclic shift offset, and may have any one of values 0 to $\Delta_{shift}^{PUCCH}-1$. Meanwhile, $n_{OC}$ is an index of an orthogonal sequence for ACK/NACK, and $n_{OC}'$ is an index of an orthogonal sequence for a reference signal. $n_{CS}$ is a cyclic shift value of a CAZAC sequence, and n' is an ACK/NACK resource index used for channelization in an RB.

Table 8 is an example of channelization of a structure in which a PUCCH format 1/1a/1b and a PUCCH format 2/2a/2b are mixed in a PRB.

TABLE 8

| Cyclic Shift | Orthogonal cover | | |
|---|---|---|---|
| | $OC_{index} = 0$ | $OC_{index} = 1$ | $OC_{index} = 2$ |
| 0 | ACK/NACK | | |
| 1 | ACK/NACK | | |

TABLE 8-continued

| Cyclic Shift | Orthogonal cover | | |
|---|---|---|---|
| | $OC_{index} = 0$ | $OC_{index} = 1$ | $OC_{index} = 2$ |
| 2 | ACK/NACK | | |
| 3 | ACK/NACK | | |
| 4 | Guard shifts | | |
| 5 | CQI | | |
| 6 | CQI | | |
| 7 | CQI | | |
| 8 | CQI | | |
| 9 | CQI | | |
| 10 | CQI | | |
| 11 | Guard shifts | | |

Referring to Table 8, cyclic shift values 0 to 3 for the PUCCH format 1/1a/1b are allocated, and cyclic shift values 5 to 10 for the PUCCH format 2/2a/2b are allocated. Cyclic shift values 4 and 11 between the PUCCH format 1/1a/1b and the PUCCH format 2/2a/2b are allocated as a guard shift.

Meanwhile, cyclic shift hopping can be performed on a symbol basis for inter-cell interference (ICI) randomization. In addition, for the ICI randomization, CS/orthogonal covering (OC) remapping can be performed between an ACK/NACK channel and a resource in a slot level.

A resource for the PUCCH format 1/1a/1b can consist of $n_{cs}$ indicating a cyclic shift in a symbol level, $n_{oc}$ indicating orthogonal covering in a slot level, and $n_{RB}$ indicating a resource block in a frequency domain. $n_r$ can be defined as an index representing the PUCCH format 1/1a/1b resources $n_{cs}$, $n_{oc}$, $n_{RB}$. That is, $n_r=(n_{cs}, n_{oc}, n_{RB})$.

The PUCCH format 2/2a/2b can carry control information such as a CQI, a precoding matrix indicator (PMI), a rank indicator (RI), CQI+ACK/NACK, etc. A Reed-Muller (RM) channel coding scheme can be applied to the PUCCH format 2/2a/2b.

Table 9 shows an example of a (20,A) RM code used in channel coding of uplink control information (UCI) of 3GPP LTE. A bit-stream $a_0, a_1, a_2, \ldots, a_{A-1}$ is used as an input of a channel coding block using the (20,A) RM code of Table 9.

TABLE 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoding bits $b_0, b_1, b_2, \ldots, b_{B-1}$ can be generated by Equation 1 below.

$$b_i = \sum_{n=0}^{A-1} (a_n \cdot M_{i,n}) \bmod 2 \quad \langle \text{Equation 1} \rangle$$

In Equation 1, $i = 0, 1, 2, \ldots, B-1$.

Table 10 shows an example of a size of a CQI feedback UCI field for wideband reporting. Table 11 is a case where a single-antenna port is assumed, and transmit diversity or open-loop spatial multiplexing PDSCH transmission is assumed.

TABLE 10

| Field | Bitwidth |
|---|---|
| Wide-band CQI | 4 |

Table 11 is an example of a CQI and PMI feedback UCI field for wideband reporting. Table 11 is a case of closed-loop spatial multiplexing PDSCH transmission.

TABLE 11

| | Bitwidths | | | |
|---|---|---|---|---|
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Preceding matrix indication | 2 | 1 | 4 | 4 |

Table 12 is an example of a size of an RI feedback UCI field for wideband reporting.

TABLE 12

| | Bitwidths | | |
|---|---|---|---|
| | | 4 antenna ports | |
| Field | 2 antenna ports | Max 2 layers | Max 4 layers |
| Rank indication | 1 | 1 | 2 |

In this case, $a_0$ and $a_{A-1}$ respectively denote a most significant bit (MSB) and a least significant bit (LSB). In the extended CP structure, A can be up to 11 except for a case where CQI and ACK/NACK are simultaneously transmitted. QPSK modulation can be applied to control information encoded into 20 bits by using an RM code. In addition, the encoded control information can be scrambled before QPSK modulation.

Figure 8:
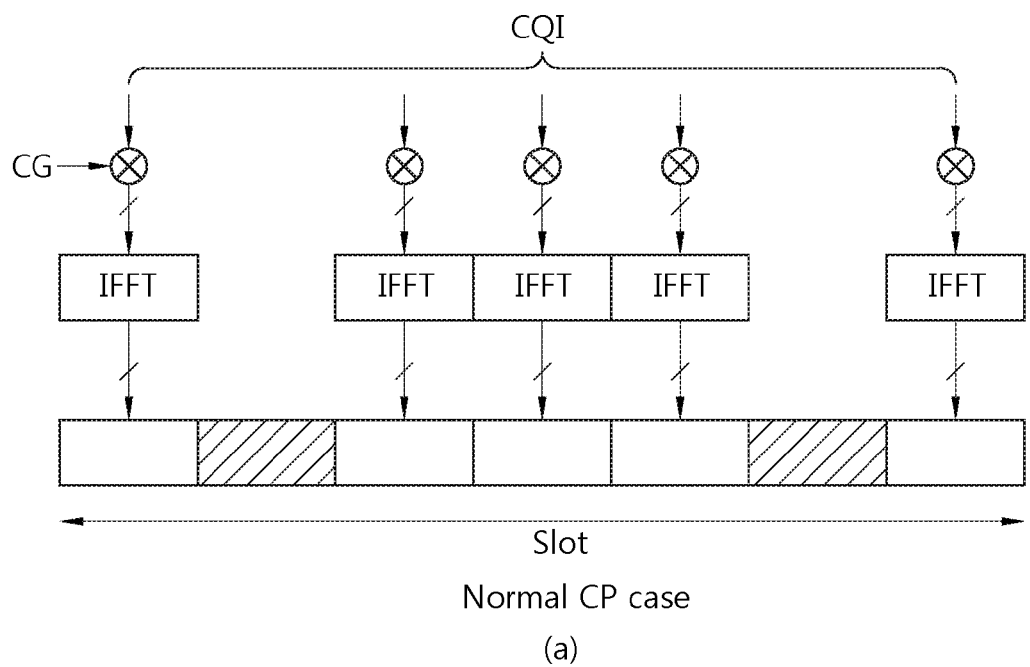
FIG. 8 shows a PUCCH format 2/2a/2b.
Figure 8:
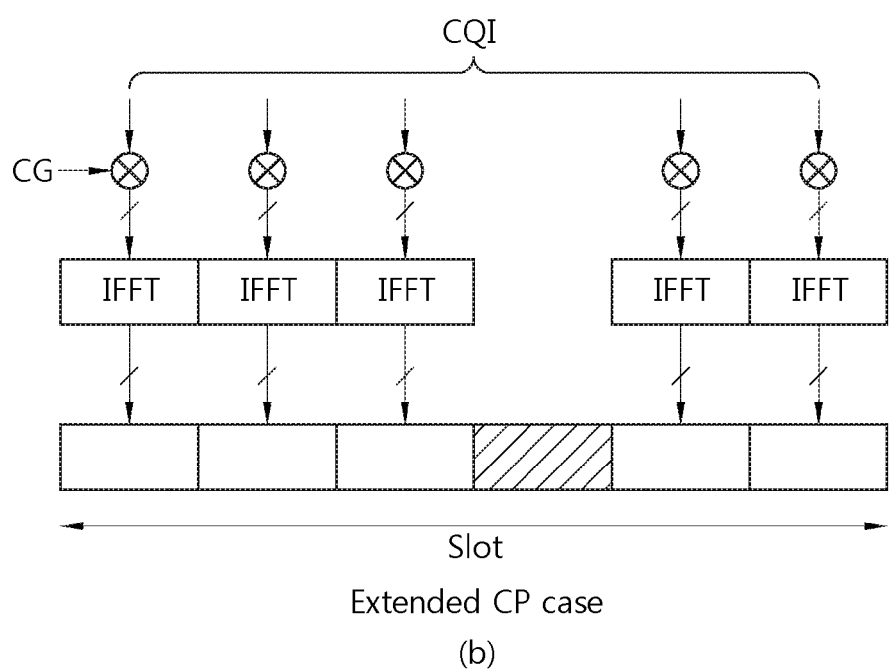

FIG. 8 shows a PUCCH format 2/2a/2b. FIG. 8(*a*) shows a normal CP structure, and FIG. 8(*b*) shows an extended CP structure. In FIG. 8(*a*), reference signals are transmitted in $2^{nd}$ and $6^{th}$ SC-FDMA symbols. In FIG. 8(*b*), reference signals are transmitted in a $4^{th}$ SC-FDMA symbol.

In a normal CP structure, one subframe includes 10 QPSK data symbols except for an SC-FDMA symbol for reference signal transmission. That is, each QPSK symbol can be spread by a cyclic shift in an SC-FDMA symbol level by using a 20-bit encoded CQI.

In addition, SC-FDMA symbol level cyclic shift hopping can be applied for ICI randomization. A reference signal can be multiplexed according to code division multiplexing (CDM) by using a cyclic shift. For example, if the number of available cyclic shift values is 12, 12 UEs can be multiplexed in one PRB. That is, each of a plurality of UEs in a PUCCH format 1/1a/1b and a PUCCH format 2/2a/2b can be multiplexed by using a cyclic shift/orthogonal covering/resource block and a cyclic shift/resource block.

A PRB used for PUCCH transmission in a slot $n_s$ can be determined by Equation 2.

$$n_{PRB} = \begin{cases} \left\lfloor \dfrac{m}{2} \right\rfloor & \text{if } (m + n_s \bmod 2) \bmod 2 = 0 \\ N_{RB}^{UL} - 1 - \left\lfloor \dfrac{m}{2} \right\rfloor & \text{if } (m + n_s \bmod 2) \bmod 2 = 1 \end{cases} \quad \langle \text{Equation 2} \rangle$$

In Equation 2, $n_{PRB}$ denotes a PRB index. $N_{RB}^{UL}$ is an uplink bandwidth configuration expressed with a multiple of $N_{SC}^{RB}$. $N_{SC}^{RB}$ is a size of a resource block in a frequency domain and is expressed with the number of subcarriers. When the PRB is mapped to a PRB, the PUCCH can be mapped in the order of an outer PRB and an inner PRB. In addition, it can be mapped in the order of a PUCCH format 2/2a/2b, an ACK/NACK combination format, and a PUCCH format 1/1a/1b.

In the PUCCH format 1/1a/1b, m can be determined by Equation 3.

$$m = \begin{cases} N_{RB}^{(2)} & \text{if } n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \dfrac{N_{cs}^{(1)}}{8} \right\rceil & \text{otherwise} \end{cases}$$ ⟨Equation 3⟩

$$c = \begin{cases} 3 & \text{normal cyclic prefix} \\ 2 & \text{extended cyclic prefix} \end{cases}$$

In Equation 3, $N_{RB}^{(2)}$ denotes a bandwidth expressed with a resource block that can be used in the PUCCH format 2/2a/2b in each slot. $n_{PUCCH}^{(1)}$ denotes an index of a resource used for PUCCH format 1/1a/1b transmission. $N_{cs}^{(1)}$ denotes the number of cyclic shift values used for the PUCCH format 1/1a/1b in a resource block used in a mixed structure of the PUCCH format 1/1a/1b and format 2/2a/2b.

In the PUCCH format 2/2a/2b, m can be determined by Equation 4.

$$m = \lfloor n_{PUCCH}^{(2)} / N_{sc}^{RB} \rfloor$$ ⟨Equation 4⟩

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 9:
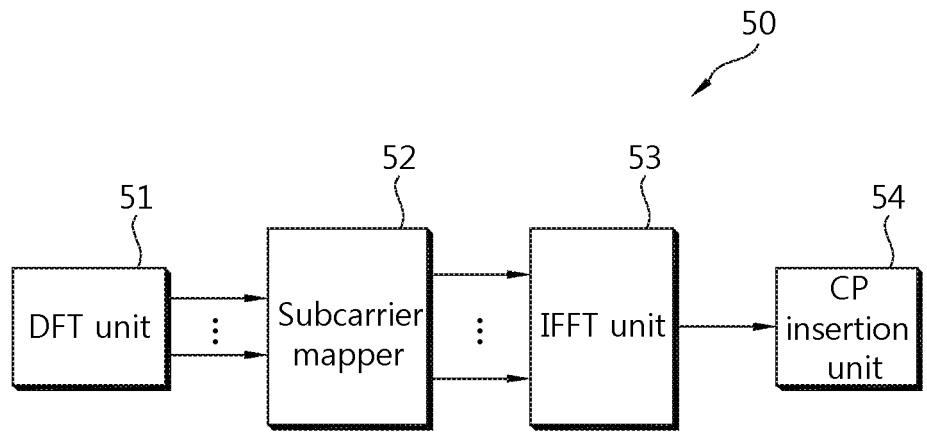
FIG. 9 shows an example of the structure of a transmitter in an SC-FDMA system.

FIG. 9 shows an example of the structure of a transmitter in an SC-FDMA system.

Referring to FIG. 9, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 10:
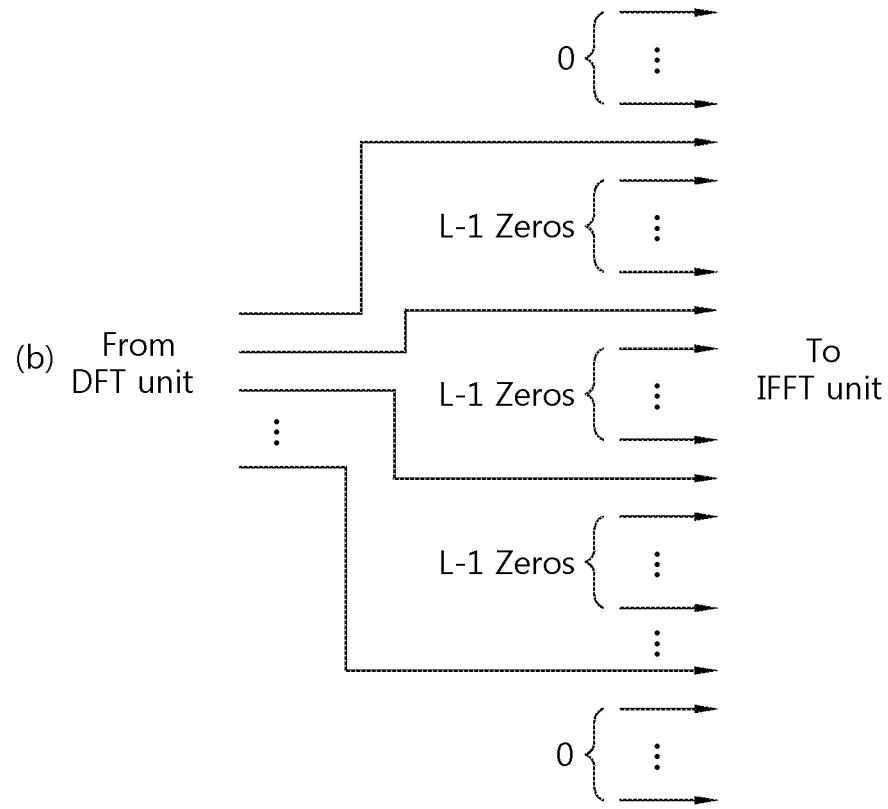
FIG. 10 shows an example of a scheme in which the subcarrier mapper maps the complex-valued symbols to the respective subcarriers of the frequency domain.

FIG. 10 shows an example of a scheme in which the subcarrier mapper maps the complex-valued symbols to the respective subcarriers of the frequency domain.

Referring to FIG. 10(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 10(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 10(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 11:
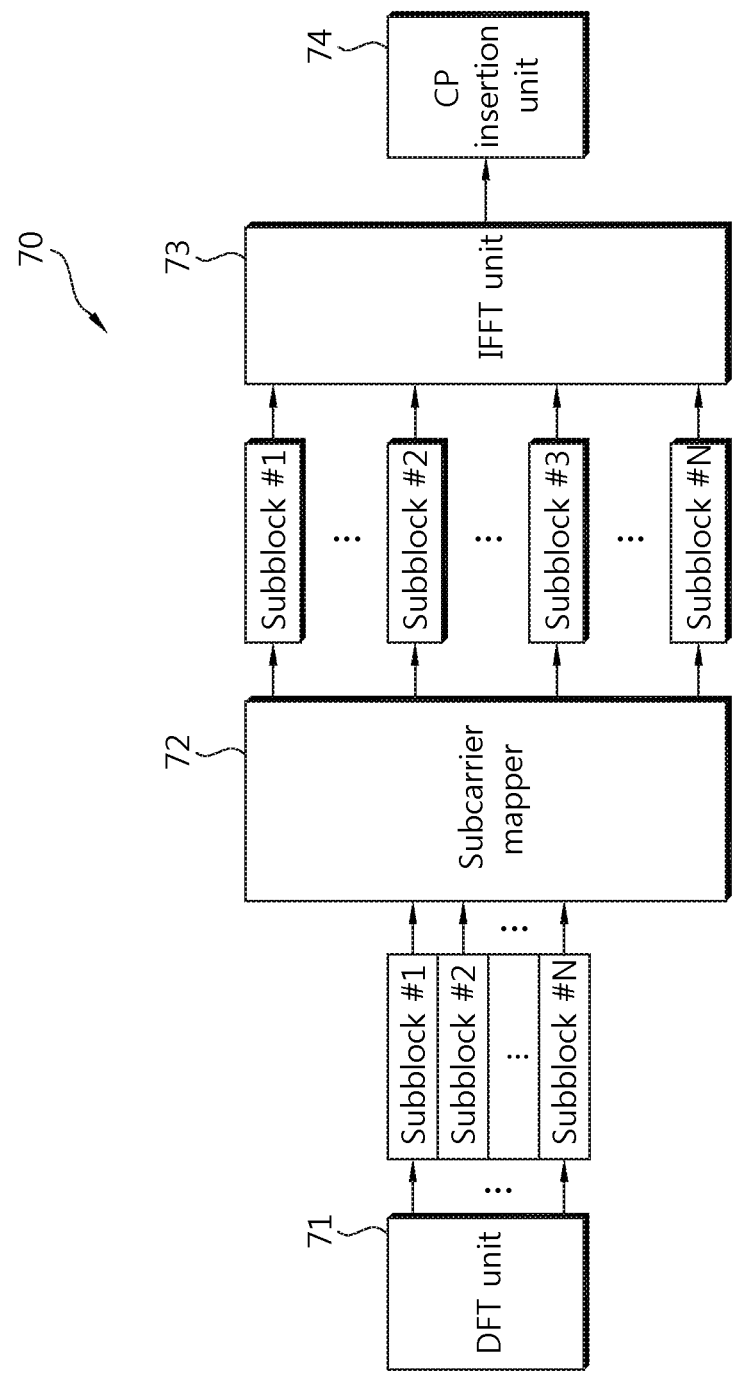
FIG. 11 to FIG. 13 show example of a transmitter using the clustered DFT-s OFDM transmission scheme.

FIG. 11 shows an example of a transmitter using the clustered DFT-s OFDM transmission scheme.

Referring to FIG. 11, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, . . . , a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 11 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 12:
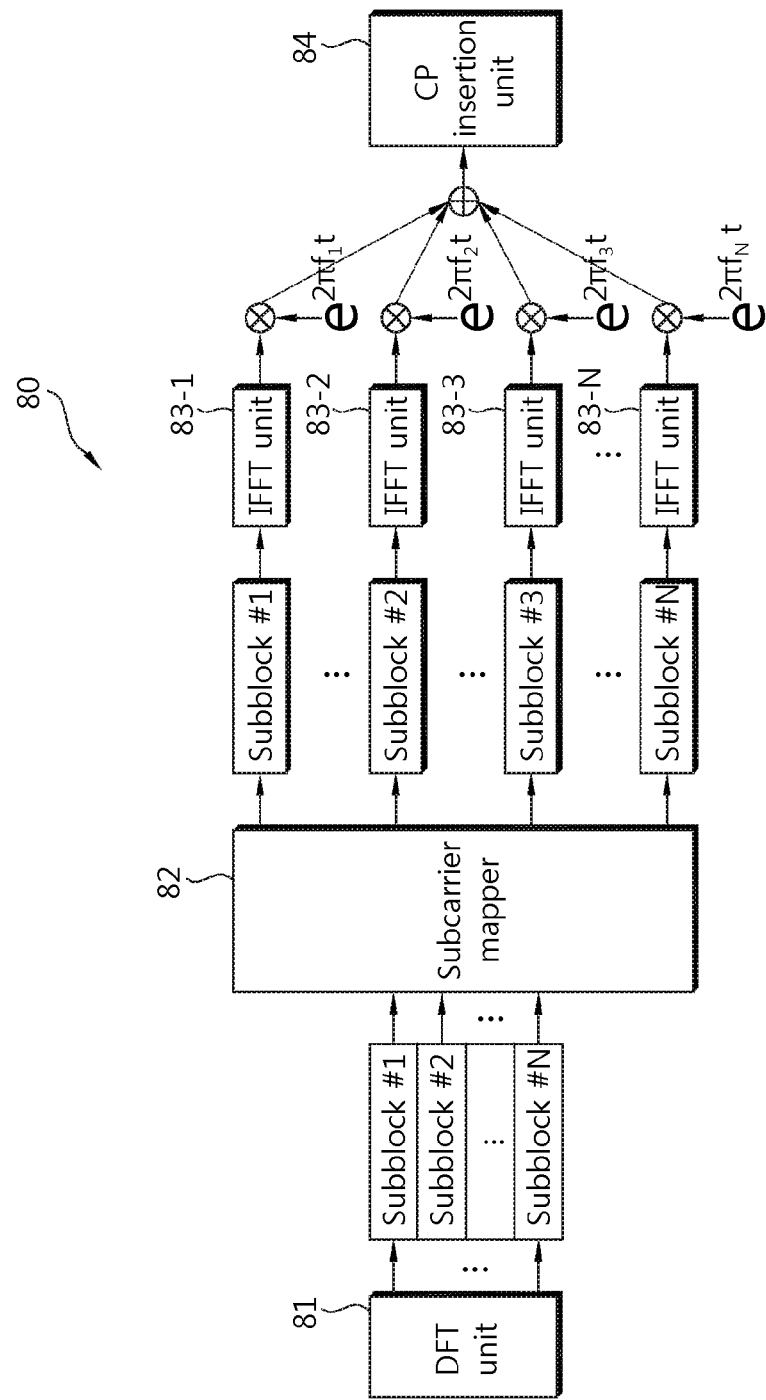

FIG. 12 shows another example of a transmitter using the clustered DFT-s OFDM transmission scheme.

Referring to FIG. 12, the transmitter 80 includes a DFT unit 81, a subcarrier mapper 82, a plurality of IFFT units 83-1, 83-2, . . . , 83-N(N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-n outputs an nth baseband signal (n=1, 2, . . . , N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 12 may be used in a discontinuous carrier allocation situation where carriers allocated to the transmitter are not contiguous to each other.

Figure 13:
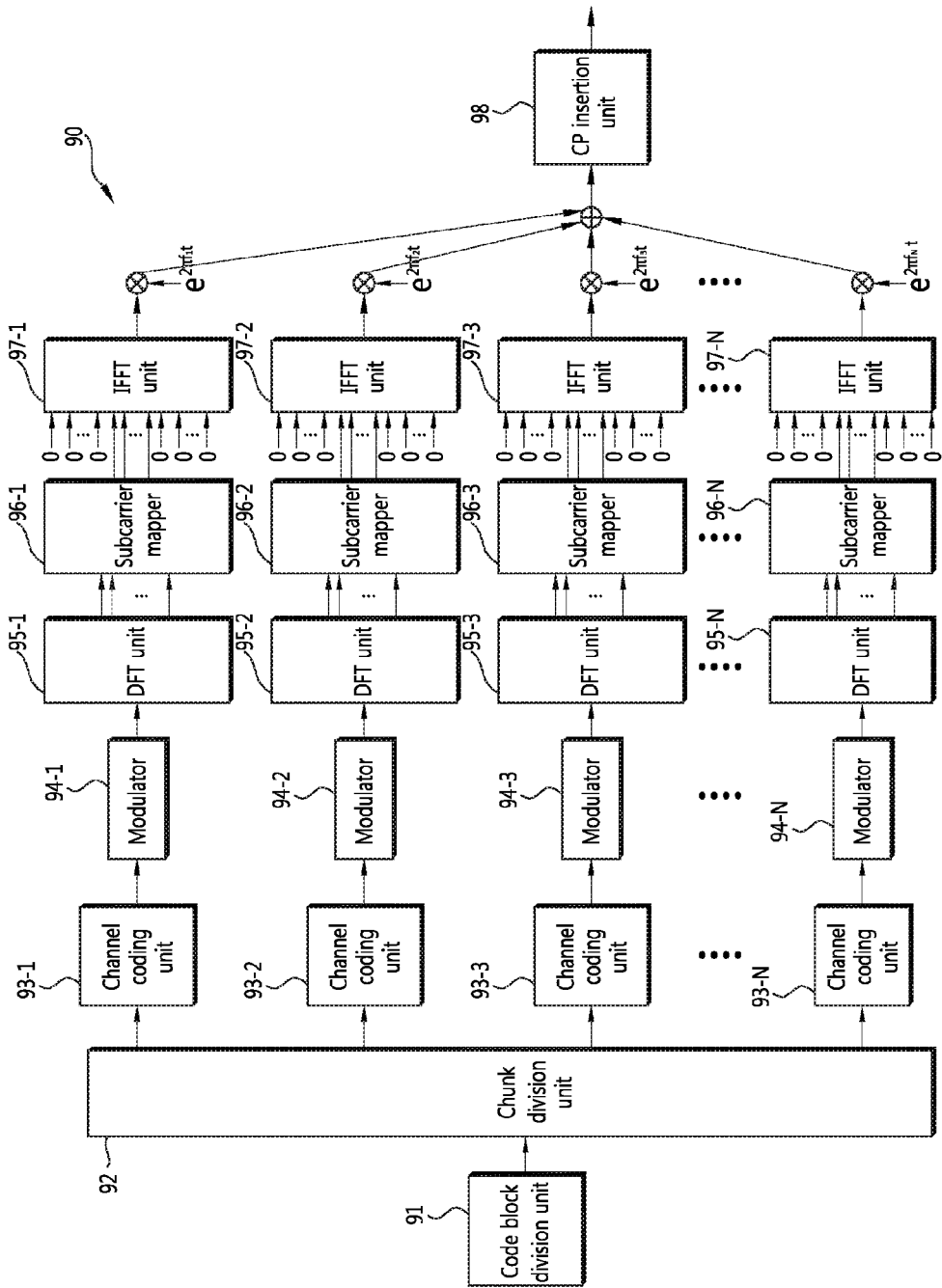

FIG. 13 is another example of a transmitter using the clustered DFT-s OFDM transmission scheme.

FIG. 13 is a chunk-specific DFT-s OFDM system performing DFT precoding on a chunk basis. This may be called Nx SC-FDMA. Referring to FIG. 13, the transmitter 90 includes a code block division unit 91, a chunk division unit 92, a plurality of channel coding units 93-1, . . . , 93-N, a plurality of modulators 94-1, . . . , 94-N, a plurality of DFT units 95-1, . . . , 95-N, a plurality of subcarrier mappers 96-1, . . . , 96-N, a plurality of IFFT units 97-1, . . . , 97-N, and a CP insertion unit 98. Here, N may be the number of multiple carriers used by a multi-carrier transmitter. Each of the channel coding units 93-1, . . . , 93-N may include a scramble unit (not shown). The modulators 94-1, . . . , 94-N may also be called modulation mappers. The transmitter 90 may further include a layer mapper (not shown) and a layer permutator (not shown) which may be placed in front of the DFT units 95-1, . . . , 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in the uplink is equal to the number of carriers used in the downlink, it is necessary to configure such that all CCs are compatible with the LTE Rel-8 system.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 14:
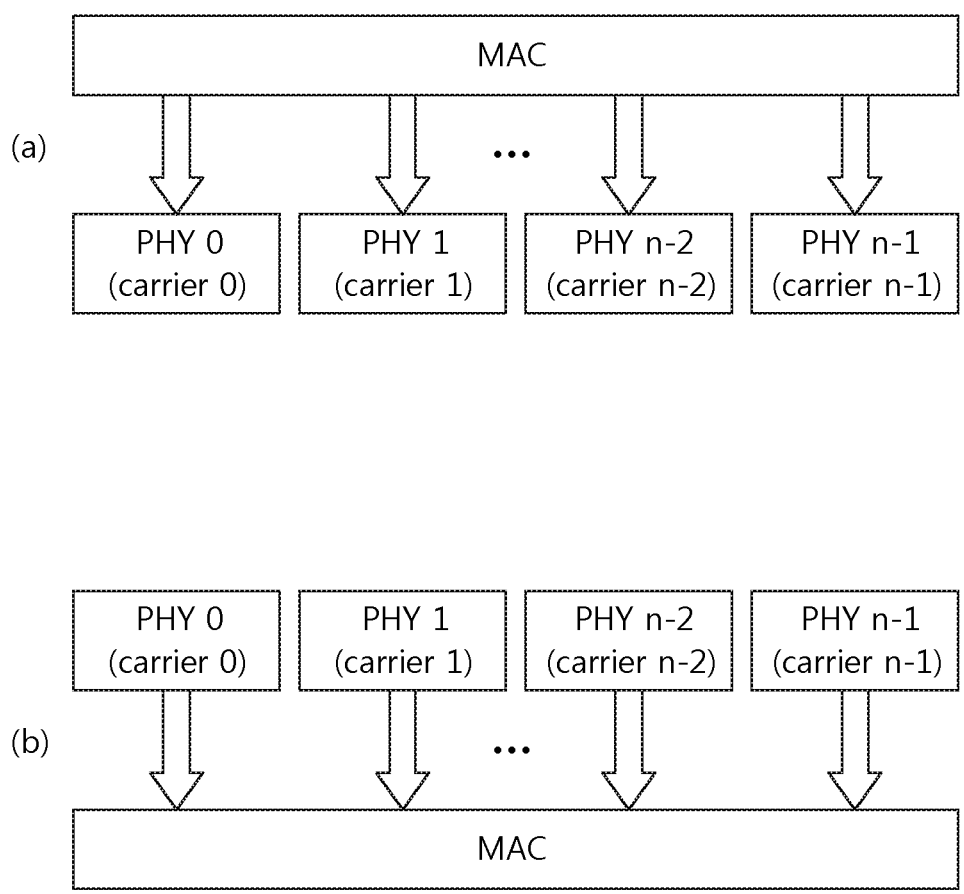
FIG. 14 to FIG. 16 show an example of a transmitter and a receiver which constitute a carrier aggregation system.

FIG. 14 shows an example of a transmitter and a receiver which constitute a carrier aggregation system.

In the transmitter of FIG. 14(a), one MAC transmits and receives data by managing and operating all of n carriers. This is also applied to the receiver of FIG. 14(b). From the perspective of the receiver, one transport block and one HARQ entity may exist per CC. A UE can be scheduled simultaneously for a plurality of CCs. The carrier aggregation system of FIG. 14 can apply both to a contiguous carrier aggregation system and a non-contiguous carrier aggregation system. The respective carriers managed by one MAC do not have to be contiguous to each other, which results in flexibility in terms of resource management.

Figure 15:
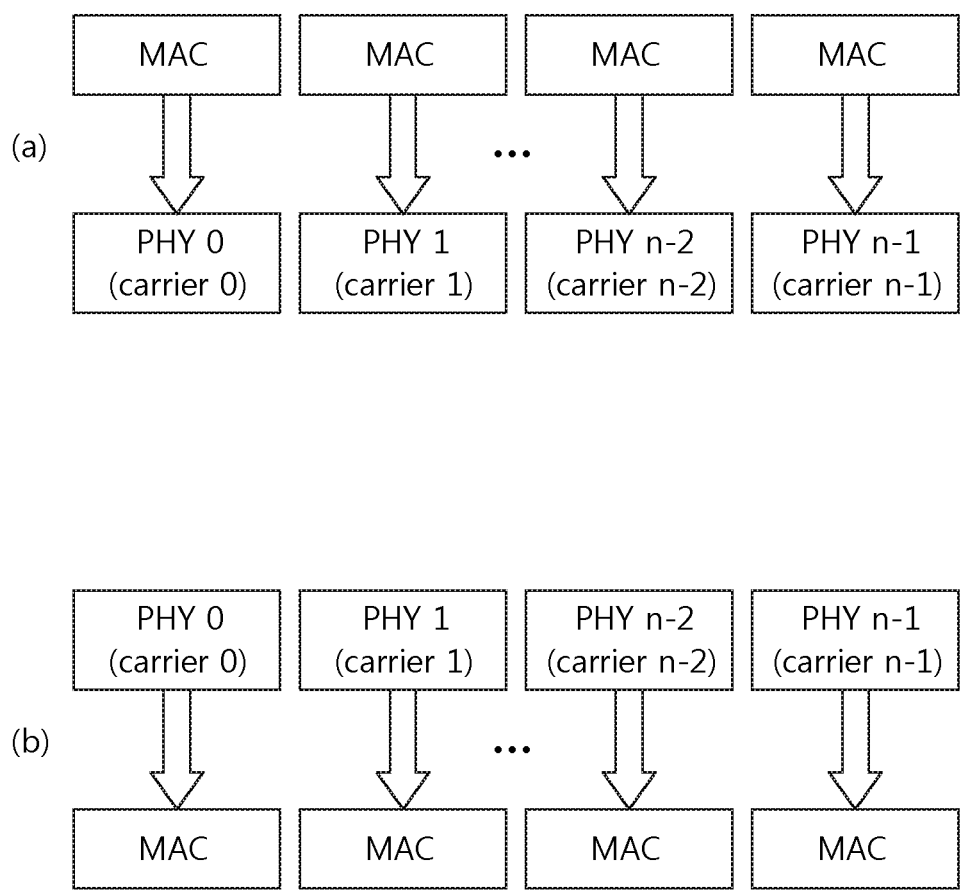
Figure 16:
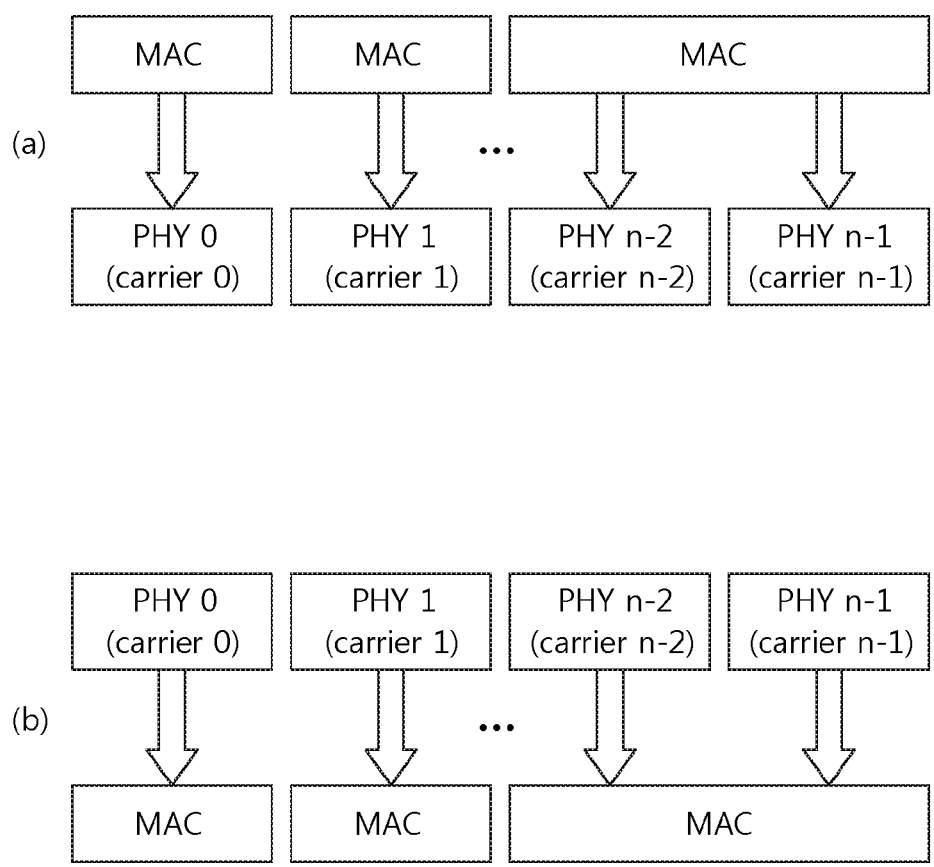

FIG. 15 and FIG. 16 are other examples of a transmitter and a receiver which constitute a carrier aggregation system.

In the transmitter of FIG. 15(a) and the receiver of FIG. 15(b), one MAC manages only one carrier. That is, the MAC and the carrier are 1:1 mapped. In the transmitter of FIG. 16(a) and the receiver of FIG. 16(b), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 14 to FIG. 16 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Meanwhile, from a perspective of a UE, there is one transport block and one hybrid automatic repeat request (HARQ) entity per scheduled component carrier. Each transport block is mapped to only a single component carrier. The UE can be simultaneously mapped to multiple component carriers.

Hereinafter, an extended physical uplink control channel (PUCCH) format will be described.

PUCCH formats 1a/1b of LTE rel-8 can carry a 1-bit or 2-bit ACK/NACK. If a carrier aggregation system includes 5 component carriers and if two codewords are transmitted per component carrier, 10 bits are required to carry the ACK/NACK with respect to the 5 component carriers. In addition, 12 bits ($5^5$=3125=11.61 bits) are required in total if a discontinuous transmission (DTX) state per component carrier is defined. To support this, the current PUCCH format cannot be used, and there is a need to define a new PUCCH format.

Figure 17:
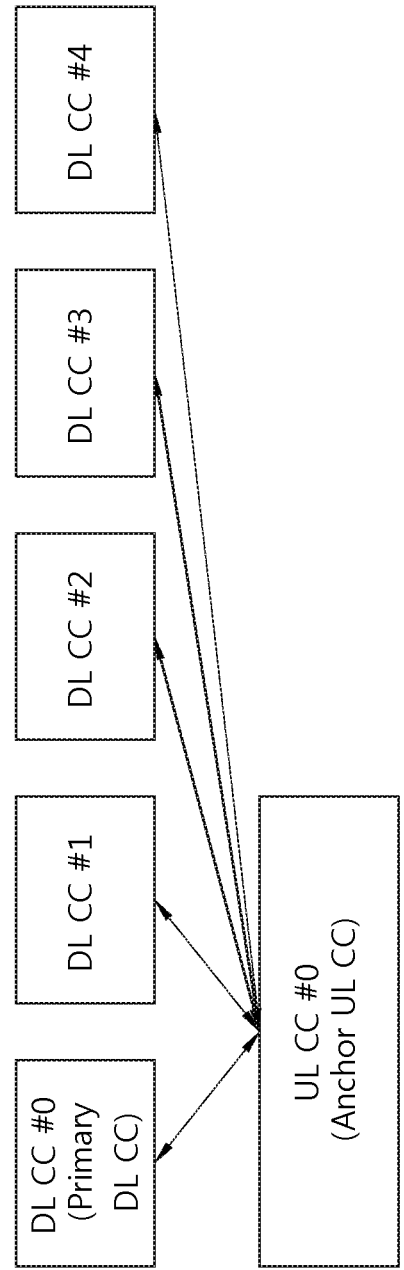
FIG. 17 is a block diagram of a case where 5 downlink component carriers (DL CCs) correspond to one uplink component carrier (UL CC) in a carrier aggregation system.

FIG. 17 is a block diagram of a case where 5 downlink component carriers (DL CCs) correspond to one uplink component carrier (UL CC) in a carrier aggregation system. All of ACK/NACKs for signals carried by DL CCs #0 to #4 are transmitted by a UL CC #0. A new PUCCH format is required to transmit the ACK/NACKs for the 5 DL CCs through one UL CC. Similarly to the ACK/NACK, a new PUCCH format is also required when a channel quality indicator (CQI)/precoding matrix indicator (PMI)/rank indicator (RI) are transmitted in the carrier aggregation system since a payload is increased.

Figure 18:
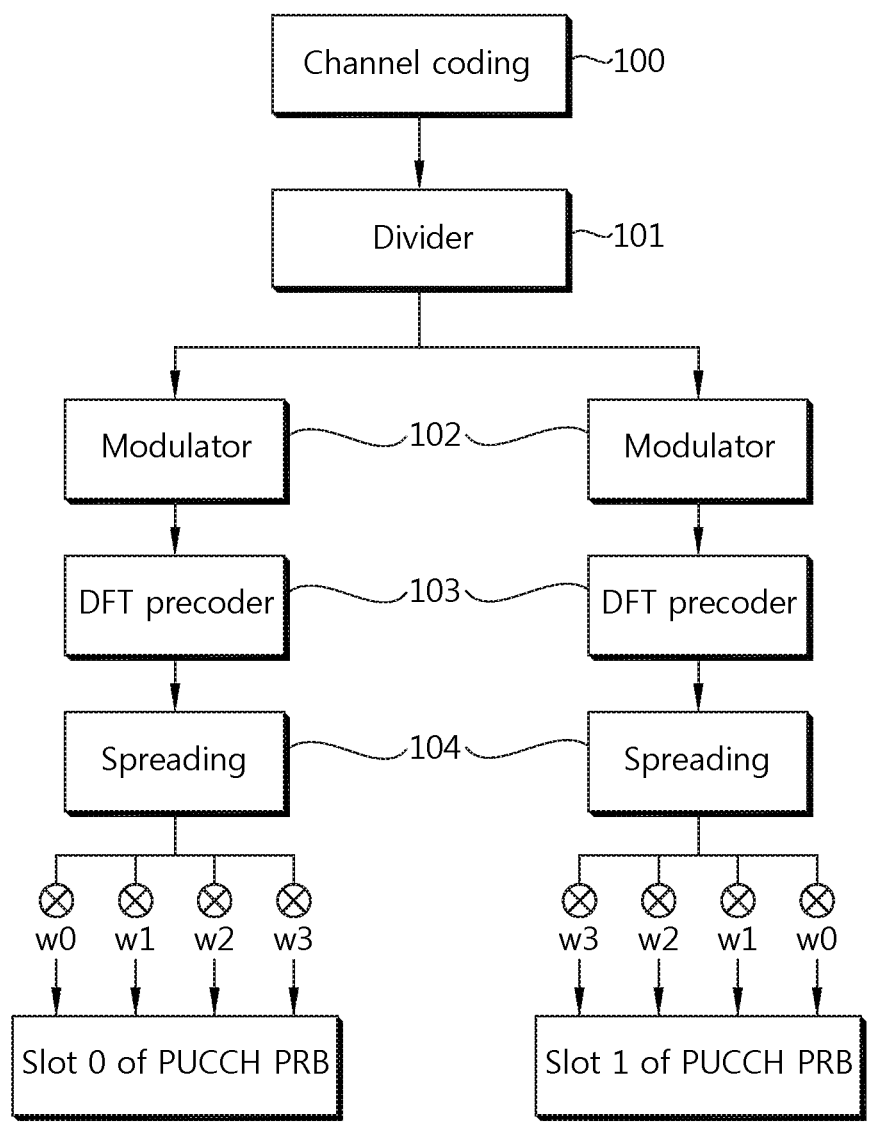
FIG. 18 and FIG. 19 are example of an extended PUCCH format.

FIG. 18 is an example of an extended PUCCH format. The extended PUCCH format of FIG. 18 may be a PUCCH format to which a DFT-s OFDM transmission scheme is applied. Although the extended PUCCH format of FIG. 18 is not limited to a specific PUCCH format, in order to facilitate explanation, the following description will be based on a normal CP structure of a PUCCH format 1 for carrying ACK/NACK. The extended PUCCH format is also applicable to PUCCH formats 2/2a/2b for uplink control information (UCI) transmission such as CQI/PMI/RI. That is, the extended PUCCH format is applicable to any control information. For example, it is possible to use the extended PUCCH format proposed to support a 13 (or higher)-bit payload in the PUCCH format 2 supporting up to a 13-bit payload.

Referring to FIG. 18, channel coding is performed on an information bit (e.g., ACK/NACK, etc.) for each component carrier (step 100). The channel coding may be any one of various types of coding schemes, such as simple repetition, simplex coding, RM coding, punctured RM coding, tail-biting convolutional coding (TBCC), low density parity check (LDPC) coding, or turbo coding. An encoding information bit generated as a result of channel coding can be rate-matched by considering a modulation symbol order to be applied and a resource to be mapped. For inter-cell interface (ICI) randomization for the generated encoding information bit, cell-specific scrambling using a scrambling code corresponding to a cell identifier (ID) or UE-specific scrambling using a scrambling code corresponding to a UE ID (e.g., a radio network temporary identifier (RNTI)) can be used.

The encoding information bit is distributed to each slot via a divider (step 101). The encoding information bit can be distributed to two slots in various manners. For example, a first part of the encoding information bit can be distributed to a first slot, and a last part of the encoding information bit can be distributed to a second slot. Alternatively, by using an interleaving scheme, an even encoding information bit can be distributed to the first slot, and an odd encoding information bit can be distributed to the second slot. The encoding information bit distributed to each slot is modulated via a modulator (step 101). A QPSK symbol can be generated by modulating the encoding information bit. Meanwhile, the modulator and the divider may be placed in a reverse order.

Discrete Fourier transform (DFT) precoding is performed on QPSK symbols in each slot to generate a single carrier waveform in each slot (step 103). In addition to the DFT precoding, an operation of Walsh precoding or the like corresponding thereto can be performed. However, it is assumed hereinafter that the DFT precoding is performed unless specified otherwise.

Time spreading is performed with an SC-FDMA symbol level on QPSK symbols for which DFT precoding is performed, by using an orthogonal code having an index m which is predetermined or determined through dynamic signaling or radio resource control (RRC) signaling (step 104). The orthogonal code of the index m can be expressed by $w_m = [w_0\ w_1\ w_2\ w_3]$ if a spreading factor (SF) is 4. If the orthogonal code is a Walsh code and the SF is 4, it can be expressed by $w_0 = [1\ 1\ 1\ 1]$, $w_1 = [1\ -1\ 1\ -1]$, $w_2 = [1\ 1\ -1\ -1]$, $w_3 = [1\ -1\ -1\ 1]$. If the orthogonal code is a DFT code, it can be expressed by $w_m = [w_0\ w_1\ \ldots\ w_{k-1}]$, where $w_k = \exp(j2\pi km/SF)$. In addition, another code other than the Walsh code and the DFT code may be used as the orthogonal code. The SF implies a factor by which data is spread, and can be related to the number of UEs to be multiplexed or the number of antennas. The SF may vary depending on a system, and may be predetermined or may be reported to the UE through DCI or RRC signaling. In addition, the orthogonal code applied with the SC-FDMA symbol level can be applied by changing an index in a slot level. That is, the orthogonal code can be hopped in the slot level.

A signal generated as described above is mapped to a subcarrier in a PRB, is then converted into a signal of a time domain by inverse fast Fourier transform (IFFT), and is transmitted via a radio frequency (RF) unit by attaching a cyclic prefix (CP).

Figure 19:
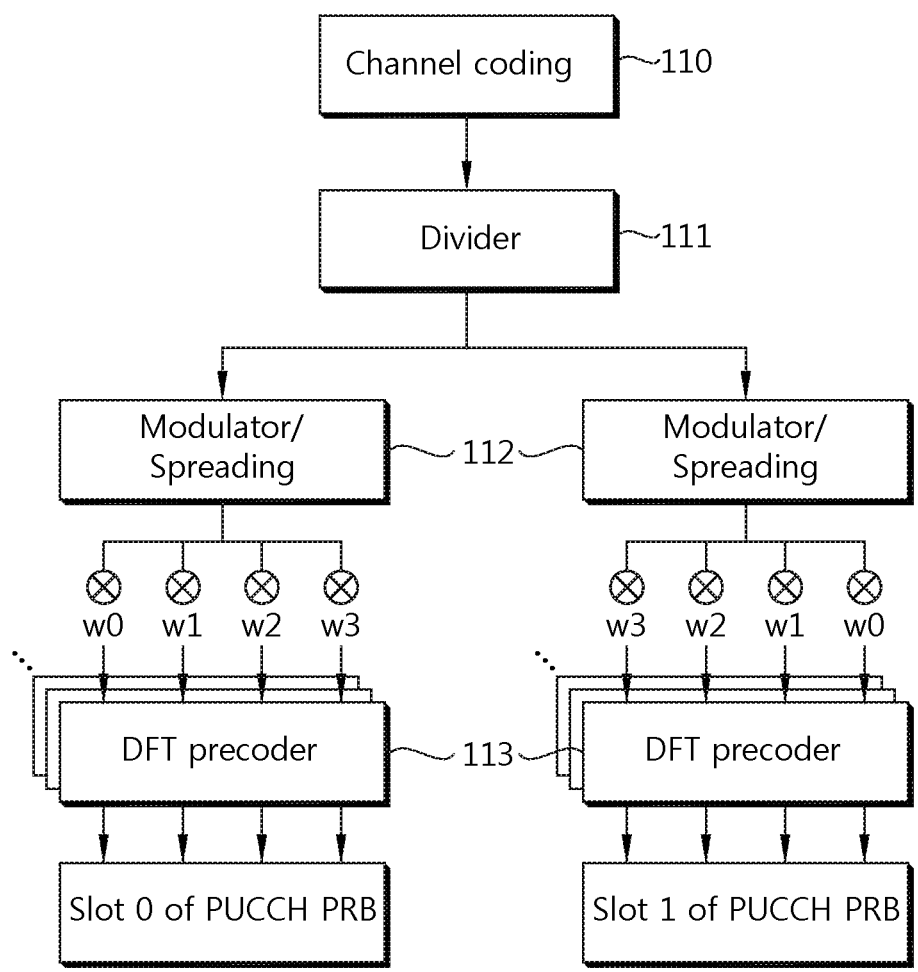

FIG. 19 is another example of an extended PUCCH format. Referring to FIG. 19, channel coding is performed on an information bit such as ACK/NACK for each component carrier (step 110), and the encoding information bit is distributed to each slot via a divider (step 111). The encoding information bit distributed to each slot is modulated via a modulator, and a QPSK symbol generated as a result of modulation is time-spread by an orthogonal code of an index m (step 112). If SF=4, the orthogonal code of the index m can be expressed by $w_m = [w_0\ w_1\ w_2\ w_3]$. DFT precoding is performed with an SC-FDMA level on time-spread QPSK symbols (step 113), and a signal generated in this manner is mapped to a subcarrier in a PRB. That is, the extended PUCCH format of FIG. 19 is different from the extended PUCCH format of FIG. 18 in a sense that time spreading is performed before DFT precoding.

Figure 20:
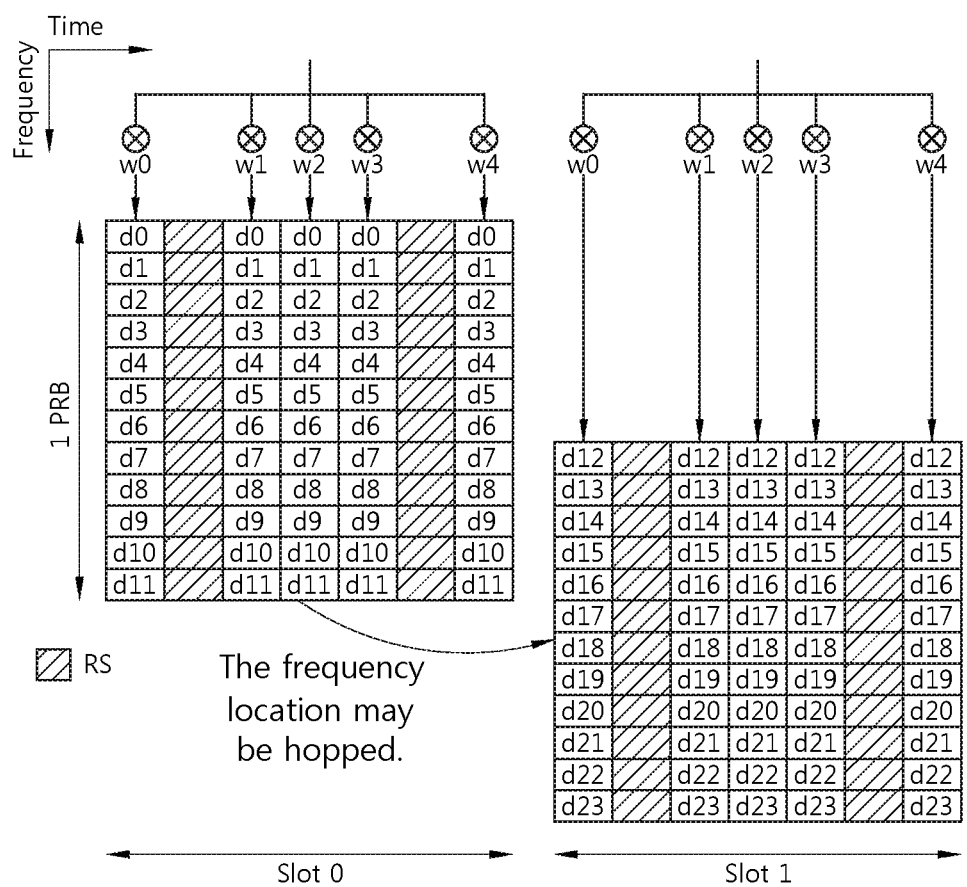
FIG. 20 and FIG. 21 show example of time spreading for a modulated QPSK symbol with an extended PUCCH format.

FIG. 20 shows an example of time spreading for a modulated QPSK symbol with an extended PUCCH format. A case where a QPSK symbol is time-spread in a normal CP is shown in FIG. 20. Referring to FIG. 20, the QPSK symbol is time-spread across 5 SC-FDMA symbols in one slot. A reference signal is mapped to $2^{nd}$ and $6^{th}$ SC-FDMA symbols in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m = [w_0\ w_1\ w_2\ w_3\ w_4]$. In addition, the orthogonal code can be hopped in a slot level.

Figure 21:
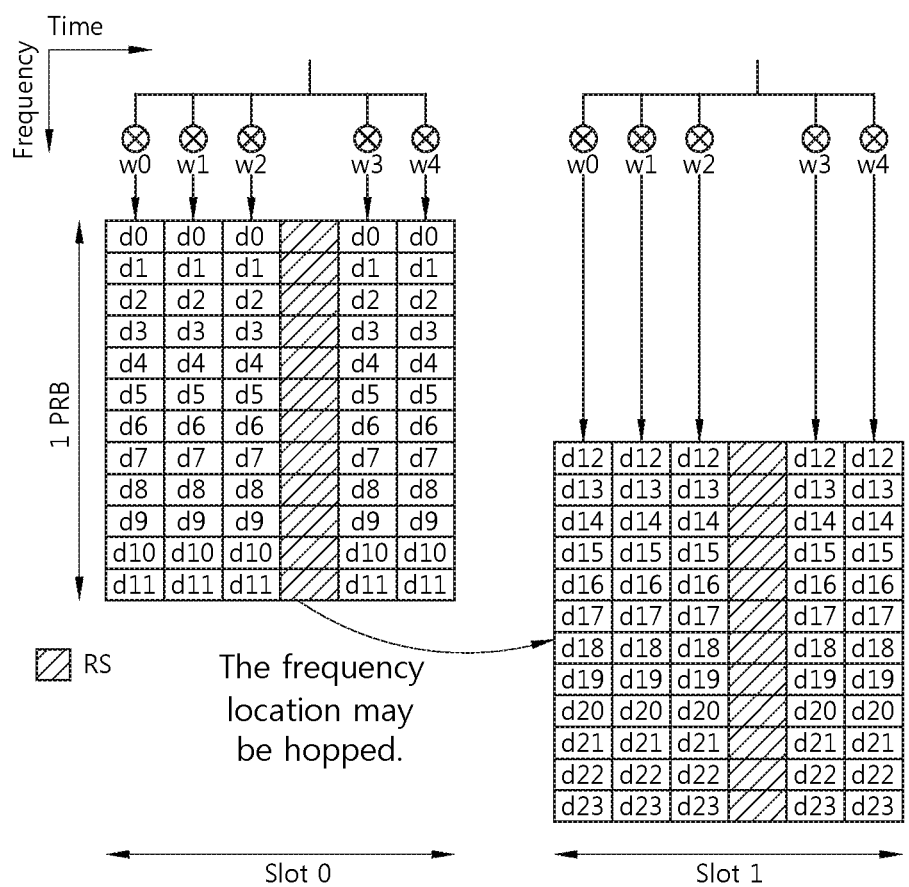

FIG. 21 is an example of time spreading for a modulated QPSK symbol with an extended PUCCH format. A case where a QPSK symbol is time-spread in an extended CP is shown in FIG. 21. Referring to FIG. 21, the QPSK symbol is time-spread across 5 SC-FDMA symbols in one slot. A reference signal is mapped to a $4^{th}$ SC-FDMA symbol in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m=[w_0 \ w_1 \ w_2 \ w_3 \ w_4]$. In addition, the orthogonal code can be hopped in a slot level.

Figure 22:
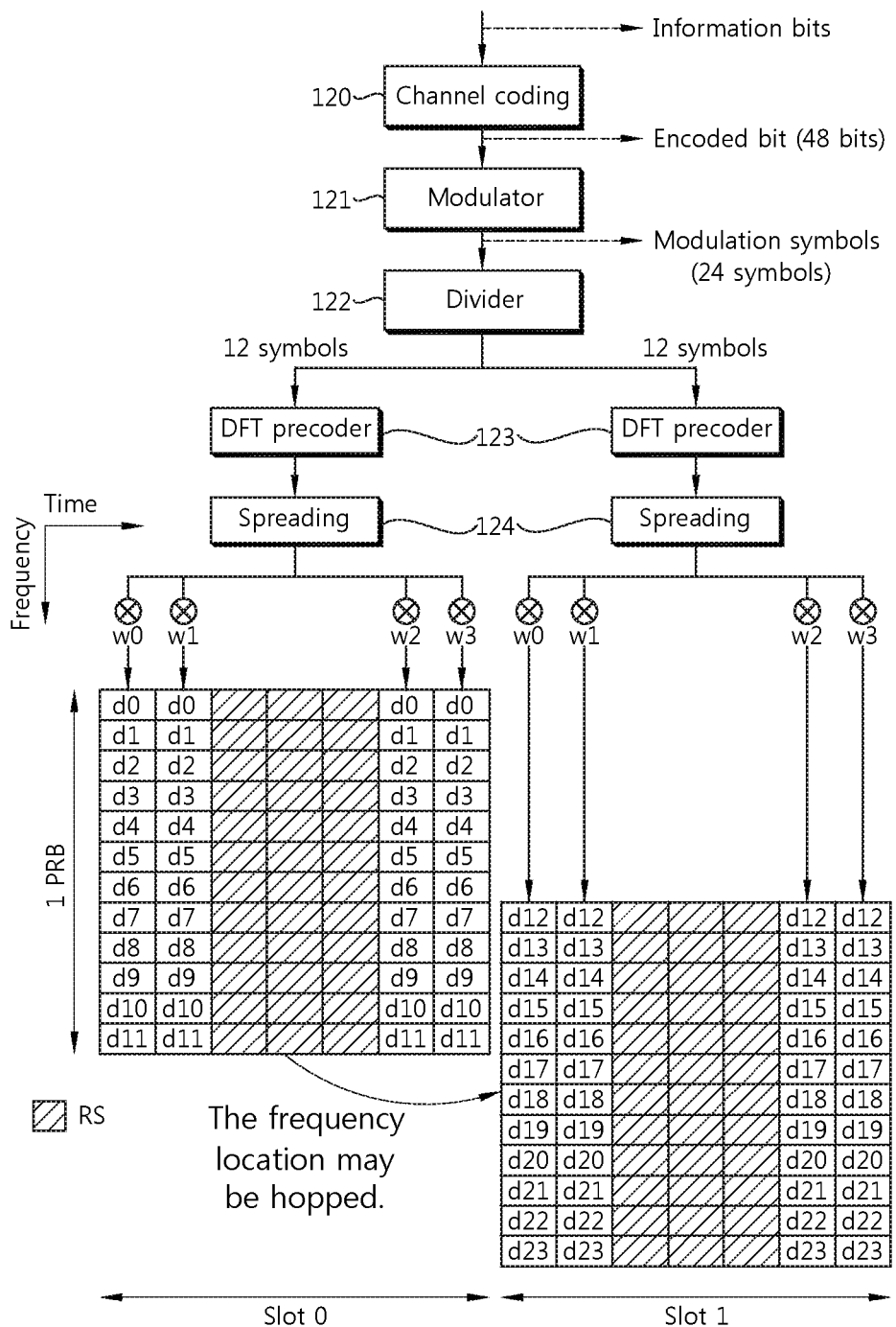
FIG. 22 and FIG. 23 are another example of an extended PUCCH format.

FIG. 22 is another example of an extended PUCCH format. The extended PUCCH format of FIG. 22 is a case where joint coding is performed on two slots in a subframe. Referring to FIG. 22, channel coding is performed on an information bit such as ACK/NACK for each component carrier (step 120). Since a QPSK modulation scheme is used and mapping is performed on two slots through one PRB consisting of 12 subcarriers in the present embodiment, 48 encoding bits can be generated. The encoding information bit is modulated via a modulator (step 121). Since a QPSK modulation scheme is used in the present embodiment, 24 QPSK symbols are generated. The QPSK symbols are distributed to each slot via a divider (step 122). The QPSK symbols can be distributed to two slots in various manners. DFT precoding is performed on the QPSK symbols distributed to each slot via the divider (step 103). Since 12 QPSK symbols are distributed to each slot in the present embodiment, 12-point DFT precoding is performed. Time spreading is performed with an SC-FDMA symbol level on QPSK symbols for which DFT precoding is performed, by using an orthogonal code having an index m (step 104). The orthogonal code can be hopped in a slot level.

A signal generated as described above is mapped to a subcarrier in a PRB, is then converted into a signal of a time domain by IFFT, and is transmitted via a RF unit by attaching a CP. If SF=4, 12-bit information for carrying ACK/NACK for 5 component carriers can be transmitted with a coding rate of 0.0625(=12/48/4), and 4 UEs can be multiplexed per one PRB.

Meanwhile, similarly to LTE rel-8, a DFT code of SF=3 and a cyclic shift can be applied to a reference signal. If SF=4, [1 1 −1 −1] is not used in the Walsh code since it is restricted by SF=3, but it can also be used. In general, the unused Walsh code part can be used when a multiplexing order for a data part in a slot is less than a multiplexing order for a reference signal part. In addition, when a specific SC-FDMA symbol of the data part is punctured by a sounding reference signal (SRS) or the like, a spreading code of SF=3 can be applied to a corresponding slot.

Figure 23:
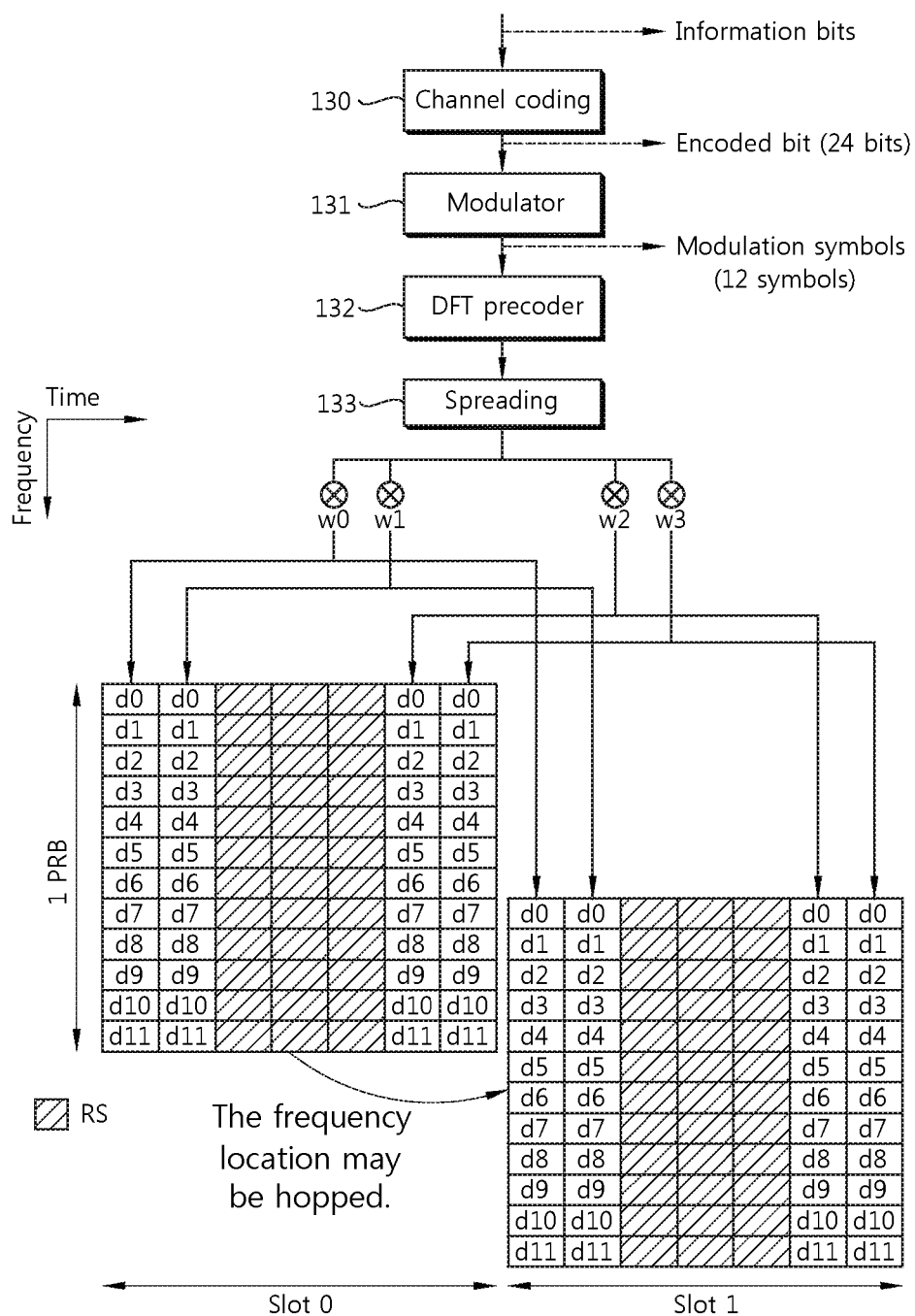

FIG. 23 is another example of an extended PUCCH format. The extended PUCCH format of FIG. 23 is a case where one slot in a subframe is repeated in another slot and separate coding is performed on the two slots. Referring to FIG. 23, channel coding is performed on an information bit such as ACK/NACK for each component carrier (step 130), and an encoding information bit is modulated via a modulator (step 131). In the present embodiment, 12 QSPK symbols are generated by applying a QPSK modulation scheme. DFT precoding is performed on QPSK symbols (step 132), and time spreading can be performed with an SC-FDMA symbol level by using an orthogonal code (step 133). The orthogonal code can be hopped in a slot level.

The extended PUCCH format of FIG. 18 to FIG. 23 can be transmitted through two transmit antennas. Accordingly, a transmit diversity can be acquired. When the extended PUCCH format is transmitted through the two transmit antennas, it can be transmitted through each antenna by selecting two orthogonal codes on the basis of one PRB. In this case, the two orthogonal codes may be any two codes among Walsh codes of SF=4. In this case, a data part can be transmitted by selecting a different orthogonal code for each antenna. The different orthogonal code may be a DFT code or Walsh code of a different index. A reference signal part can be transmitted through two orthogonal resources in which cyclic shift and orthogonal code covering (OCC) are combined. In addition, when the extended PUCCH format is transmitted through the two transmit antennas, it can be transmitted through each antenna on the basis of a different PRB. Since transmission is performed based on the different PRB, there is no restriction on an orthogonal code applied to a signal transmitted to each antenna or an orthogonal resource to which the reference signal is applied. In this case, two orthogonal codes of the data part and two orthogonal resources of the reference signal part may be predetermined or may be given through a PDCCH or RRC signaling. The orthogonal code of the data part and the orthogonal resource of the reference signal part can be individually signaled, or if an orthogonal code or orthogonal resource for any one of the antennas is signaled, an orthogonal code or orthogonal resource for the other antenna can be derived from the signaling.

The UE can transmit an SR when a resource for UL data transmission is required. That is, SR transmission is event-triggered. For SR transmission, the UE receives an sr-PUCCH-ResourceIndex parameter and an sr-ConfigIndex parameter $I_{SR}$ indicating an SR configuration index by using a radio resource control (RRC) message. At the occurrence of an SR transmission event, the UE transmits the SR through an orthogonal resource indicated by the sr-PUCCH-ResourceIndex. Meanwhile, $SR_{PERIODICITY}$ indicating a period for SR transmission and $N_{OFFSET,SR}$ indicating a subframe for SR transmission can be configured by the sr-ConfigIndex parameter. That is, the SR is transmitted in a specific subframe which is periodically repeated according to $I_{SR}$ given by a higher layer. In addition, as a resource for the SR, a subframe resource and a code division multiplexing (CDM)/frequency division multiplexing (FDM) resource can be allocated. Table 13 shows an SR transmission period and an SR subframe offset according to an SR configuration index.

TABLE 13

| SR configuration Index $I_{SR}$ | SR periodicity (ms) $SR_{PERIODICITY}$ | SR subframe offset $N_{OFFSET,SR}$ |
| --- | --- | --- |
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155 | | reserved |

Figure 24:
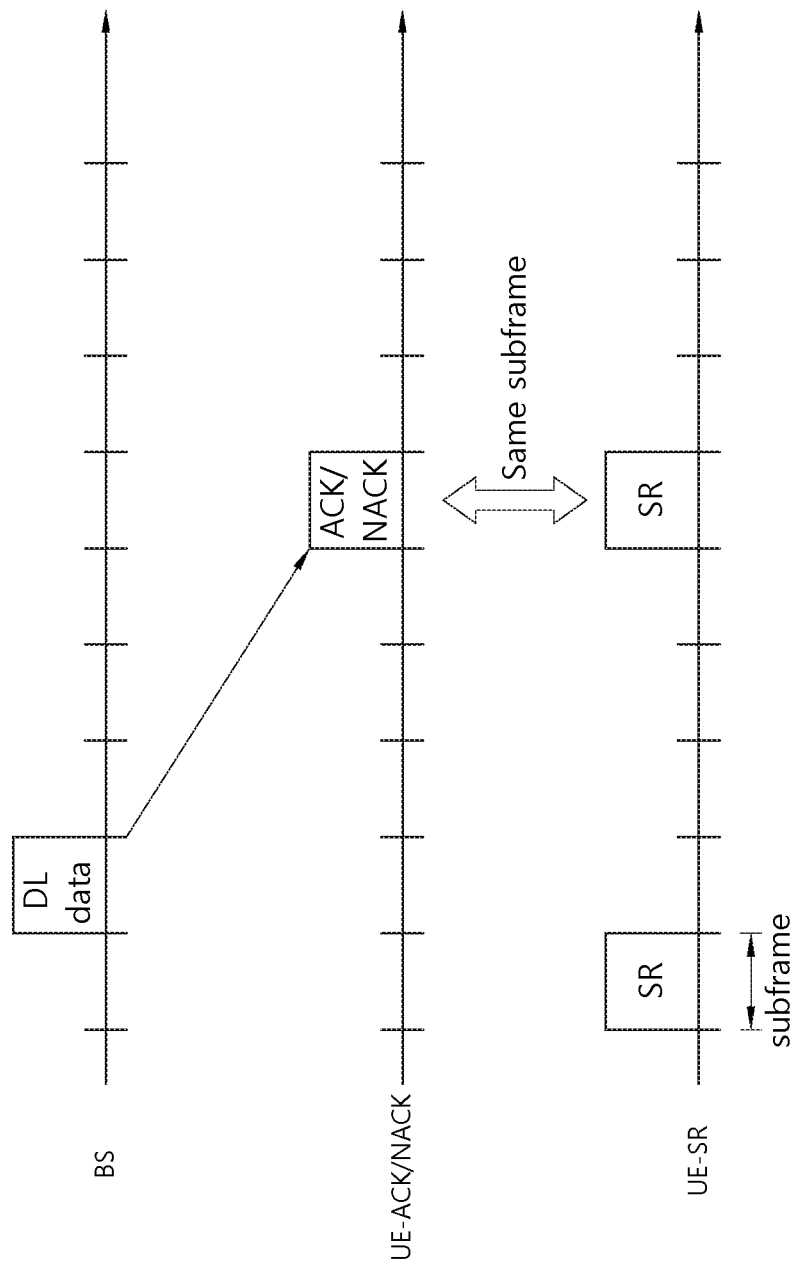
FIG. 24 is an example of a case where a UE transmits ACK/NACK and SR.

FIG. 24 is an example of a case where a UE transmits ACK/NACK and SR. When a BS transmits downlink data to the UE in a subframe n, the UE can transmit the ACK/NACK in response to the downlink data in a subframe (n+4). In addition, a periodicity for transmitting the SR is determined consistently by Table 13. Accordingly, an SR transmission event and an ACK/NACK transmission event can occur in the same subframe or the same slot. In this case, the UE transmits the ACK/NACK by using an orthogonal resource allocated for the SR in LTE rel-8. The BS can recognize that the SR transmission event and the ACK/NACK transmission event can occur simultaneously. Therefore, the BS can know whether the SR and the ACK/NACK are transmitted simultaneously or only the ACK/NACK is transmitted by decoding both an orthogonal resource allocated for the SR and an orthogonal resource allocated for the ACK/NACK.

In LTE-A, the SR transmission event and the ACK/NACK transmission event can also occur simultaneously. However, when a carrier aggregation system is applied in LTE-A, a resource allocated for the SR is a UE-specific resource and a resource allocated for the ACK/NACK is a component carrier (CC)-specific resource, and thus the ACK/NACK cannot be transmitted by using an SR resource similarly to LTE rel-8. Accordingly, there is a need to propose a method for solving this problem.

The present invention described hereinafter can be applied to solve a problem occurring in transmission of an extended PUCCH format for carrying an SR and multiple ACK/NACKs in the same subframe in a carrier aggregation system. However, the present invention is not limited thereto. That is, the present invention can also be applied to a case where $1^{st}$ UCI is transmitted through the extended PUCCH format, and $2^{nd}$ UCI is transmitted in the same subframe as the $1^{st}$ UCI. The $1^{st}$ UCI may be ACK/NACK, SR, CQI, PMI, RI, channel state information (CSI), etc. The $2^{nd}$ UCI is not limited to a specific format, but particularly may be a PUCCH format of LTE rel-8. It is assumed in the following embodiment that the $1^{st}$ UCI is multiple ACK/NACKs for a DL CC and the $2^{nd}$ UCI is an SR transmitted through a PUCCH format of LTE rel-8. In addition, it is also assumed that the carrier aggregation system is applied and thus an ACK/NACK signal for multiple DL CCs is transmitted. However, the present invention is not limited thereto, and thus the DL CC is only an exemplary entity. That is, the entity can indicate not only the DL CC but also a codeword, an uplink component carrier (UL CC), a cell, a BS, a UE, a relay station, a pico/femto cell, or the like. Accordingly, the DL CC can be replaced to another entity in the following description. In addition, the present invention can be widely used not only for the extended PUCCH format but also for a structure which uses channel coding. For example, the present invention is applicable to a case where the ACK/NACK is transmitted by using PUCCH formats 2/2a/2b.

In a case where the SR transmission event and the ACK/NACK transmission event occur in the same subframe or the same slot, it can be solved by the following method.

1) Joint Coding of SR and ACK/NACK

When a UE must transmit an ACK/NACK in a subframe or slot capable of transmitting an SR, an information bit related to the SR may be embedded to the ACK/NACK and then transmitted by performing joint coding. When the ACK/NACK for multiple DL CCs is transmitted by using an extended PUCCH format, it can be transmitted in a format in which an ACK/NACK bit for each DL CC is concatenated. A resource for the extended PUCCH format for carrying the ACK/NACK can be determined implicitly or can be determined explicitly through RRC signaling or the like. In addition, an SR information bit may be one bit. The 1-bit information bit may be embedded to the ACK/NACK in a format in which an information bit field is separately defined within the ACK/NACK, or may be embedded to the ACK/NACK in a format in which a state within the original ACK/NACK is further used.

A case where the 1-bit SR information bit is transmitted by being embedded to the ACK/NACK can be explained by the extended PUCCH format of FIG. 18 to FIG. 23. In general, when 5 DL CCs are assumed, 12 bits are required to transmit the ACK/NACK for the DL CCs. When an SR transmission event and an ACK/NACK transmission event overlap in a subframe or slot, 12 bits for ACK/NACK transmission and 1 bit for SR transmission, that is, 13-bit information is channel-coded to generate 48-bit encoding information, and QPSK modulation is performed thereon and a generated QPSK symbol is mapped. In this case, if the 1-bit SR information bit is 0, it may indicate that there is no SR transmission event, and if the 1-bit SR information bit is 1, it may indicate that the SR transmission event exists. Alternatively, on the contrary, if the SR information bit is 0, it may indicate that the SR transmission event exists, and if the one bit for the SR is 1, it may indicate that there is no SR transmission event. In this case, a position of the SR information bit or the SR state information in the ACK/NACK may be predetermined. For example, the SR information bit can be located to the first or last position of an ACK/NACK bit-stream, and the SR state information can be located in a last state. Accordingly, it can be known in advance that a corresponding bit or a corresponding state is SR-related information.

2) ACK/NACK Bundling

In a case where the SR transmission event and the ACK/NACK transmission event simultaneously occur, ACK/NACKs for multiple DL CCs can be bundled and transmitted. A bundled representative ACK/NACK can be transmitted by using a resource allocated for an SR. The ACK/NACKs for the multiple DL CCs can also be bundled and transmitted when a CQI transmission event and an ACK/NACK transmission event occur simultaneously. In this case, the bundled representative ACK/NACK can be transmitted through a $2^{nd}$ reference signal symbol of a slot in a channel on which a CQI is transmitted.

The multiple ACK/NACKs can be bundled in various manners. For example, ACK/NACKs for multiple DL CCs can be bundled by a logical AND operation. That is, if ACK/NACK information for all DL CCs are ACK, a representative ACK/NACK can carry the ACK. If ACK/NACK information for at least one CC is NACK, the representative ACK/NACK can carry the NACK. In addition, if ACK/NACK information for at least one CC is in a DTX state, the representative ACK/NACK can carry DTX. Alternatively, when an SR is positive, b(0) and b(1) are transmitted by using an allocated SR PUCCH resource. The values b(0) and b(1) can be determined by Table 14.

TABLE 14

| Number of ACK among multiple ($U_{DAI} + N_{SPS}$) ACK/NACK responses | b(0), b(1) |
| --- | --- |
| 0 or None (UE detect at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

Figure 25:
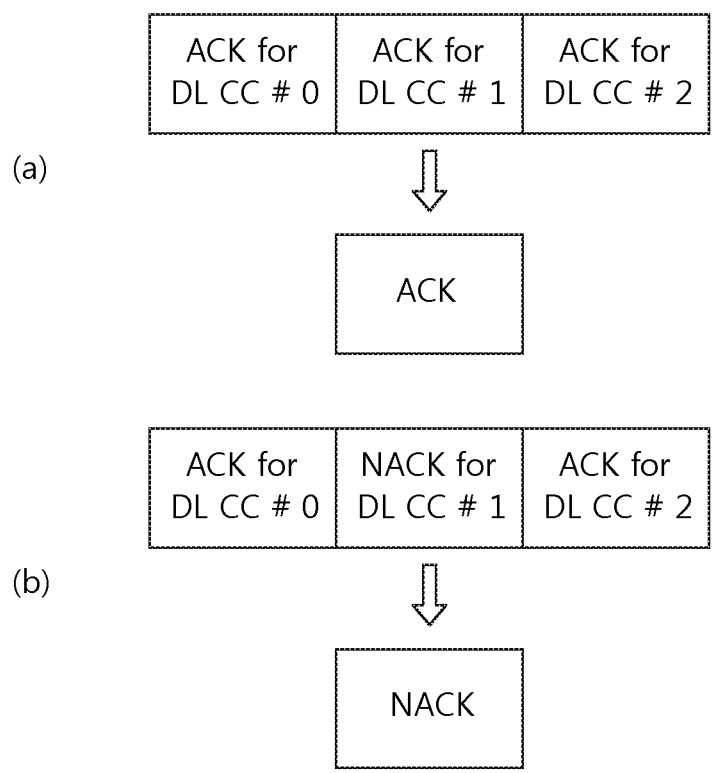
FIG. 25 is an example of configuring ACK/NACK bundling according to the proposed UCI transmission method.

Referring to Table 14, b(0) and b(1) are determined according to the number of detected ACKs. That is, b(0) and b(1) which are mapped to a value obtained by performing a modulo-4 operation with respect to the number of detected ACKs are transmitted. FIG. 25 is an example of configuring ACK/NACK bundling according to the proposed UCI transmission method. When assuming 3 DL CCs and 2 codewords for each DL CC, 7 bits (i.e., 5^3=125) including a DTX state are required for ACK/NACK corresponding thereto. FIG. 25(a) shows a case where an ACK is transmitted as a representative ACK/NACK when ACK/NACK information for 3 DL CCs is the ACK. FIG. 25(b) shows a case where a NACK is transmitted as a representative ACK/NACK when ACK/NACK information for a DL CC #1 is the NACK among ACK/NACK information for 3 DL CCs.

3) Phase Modulation

When there are at least two SC-FDMA symbols for transmitting a reference signal in a PUCCH format 2 and an extended PUCCH format to which a DFT-s OFDM transmission scheme is applied, phase modulation can be performed on any one reference signal SC-FDMA symbol according to a presence/absence of an SR transmission event. That is, phase modulation may not be performed when there is no SR transmission event (or phase modulation with 1 is performed), and phase modulation with −1 may be performed when the SR transmission event exists. In this case, phase modulation must not be performed on at least one reference signal SC-FDMA symbol. This is because a reference signal SC-FDMA symbol which is not phase-modulated is required to be used as a basis.

Figure 26:
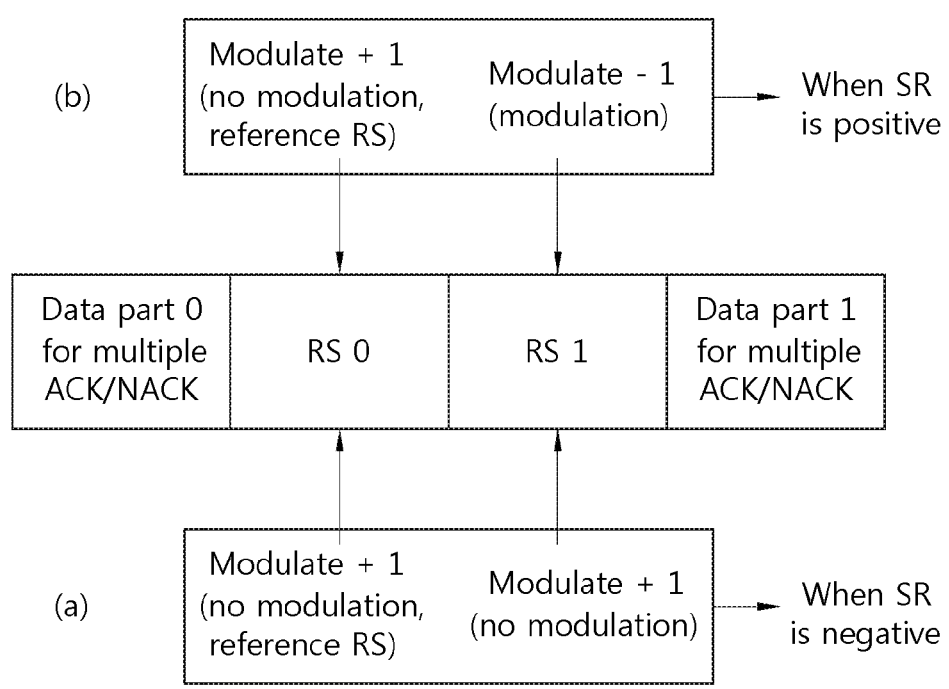
FIG. 26 shows an example of a case where phase modulation is performed according to the proposed UCI transmission method.

FIG. 26 shows an example of a case where phase modulation is performed according to the proposed UCI transmission method. The PUCCH format of FIG. 21 includes two reference signal SC-FDMA symbols. FIG. 26(a) is a case where an SR transmission event does not exist. The two reference signal SC-FDMA symbols are phase-modulated with +1, that is, phase modulation is not performed. FIG. 26(b) is a case where the SR transmission event exists. A $1^{st}$ reference signal SC-FDMA symbols (i.e., RS0) is phase-modulated with +1, that is, phase modulation is not performed. The RS0 which is not phase-modulated takes a role of a base reference signal. A $2^{nd}$ reference signal SC-FDMA symbol (i.e., RS1) is phase-modulated with −1. Accordingly, the existence of the SR transmission event can be reported to a BS. Although it is assumed in FIG. 26 that the RS0 takes a role of the base reference signal, on the contrary, the RS1 may take a role of the base reference signal and phase modulation can be performed on the RS0 according to the SR transmission event. In addition, although a case where phase modulation with +1 or −1 is performed on a 1-bit SR is assumed in FIG. 26, if $2^{nd}$ UCI has a length of M bits, phase modulation with a complex value can be performed by applying a modulation scheme of $2^M$-PSK or $2^M$-QAM. In this case, the modulation scheme and the complex value may be predetermined.

4) Dropping

If a transmission even of $1^{st}$ UCI and a transmission event of $2^{nd}$ UCI overlap, a priority of the UCIs may be assigned and any one of the UCIs may not be transmitted according to the priority. For example, if the $1^{st}$ UCI is ACK/NACK for multiple DL CCs transmitted through an extended PUCCH format and the $2^{nd}$ UCI is CQI/PMI/RI for a specific DL CC transmitted through a PUCCH format 2, when the ACK/NACK has a higher priority than the CQI, the CQI may not be transmitted and only the ACK/NACK may be transmitted. In LTE-A, the priority may be set in the order of SR, ACK/NACK, RI, and CQI/PMI.

5) Embedded PUCCH Format

Multiple PUCCH formats can be embedded to any one PUCCH format. That is, if $1^{st}$ UCI transmitted through a PUCCH format type A and $2^{nd}$ UCI transmitted through a PUCCH format type B are transmitted in the same subframe, they can be transmitted by embedding any one of PUCCH format types to the other PUCCH format type. When the embedded PUCCH format is channel-coded, separate coding can be performed for each UCI or the UCIs can be joint-coded. For example, if the PUCCH format type A is the extended PUCCH format of FIG. 18 to FIG. 23, the PUCCH format type B is the PUCCH format 2, the $1^{st}$ UCI is a 5-bit ACK/NACK for multiple DL CCs, and the $2^{nd}$ UCI is 5-bit CQI information, then 10-bit information of the $1^{st}$ UCI and the $2^{nd}$ UCI can be transmitted by being joint-coded through the PUCCH format type A.

Figure 27:
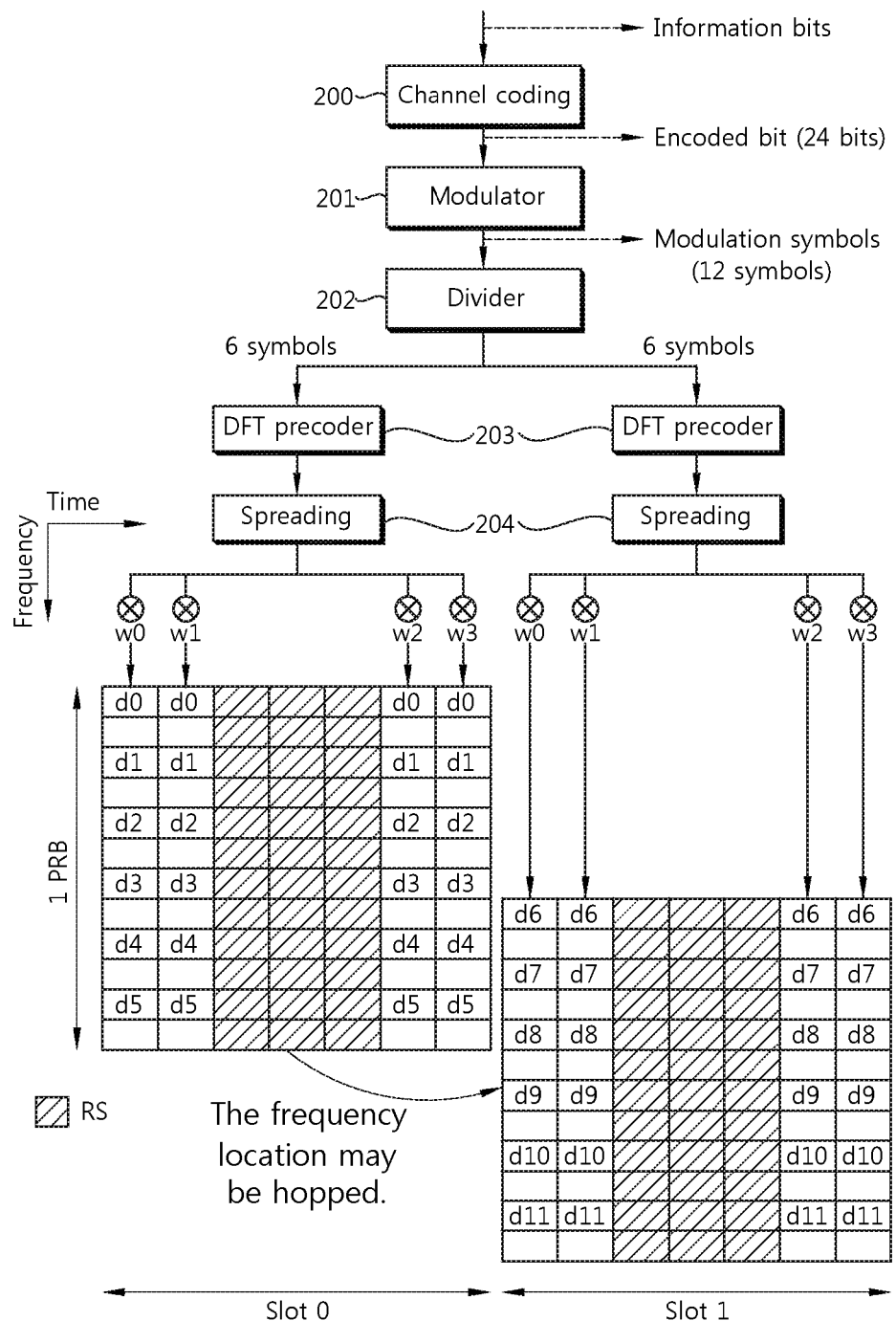
FIG. 27 to FIG. 30 are another example of an extended PUCCH format.
Figure 28:
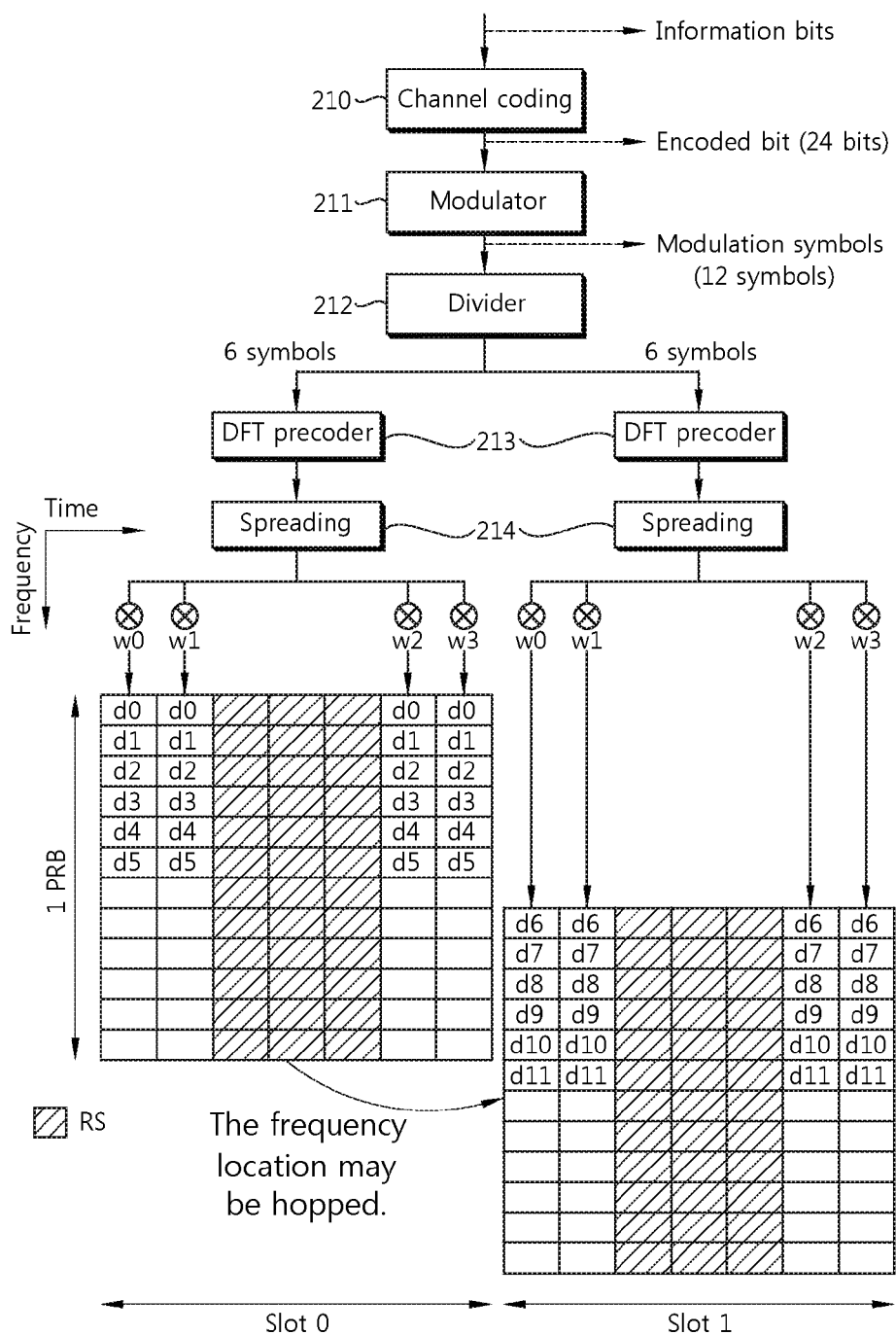

FIG. 27 and FIG. 28 are another example of an extended PUCCH format. The extended PUCCH format of FIG. 27 and FIG. 28 is a case where joint coding is performed on two slots in a subframe. That is, it has a similar structure as the extended PUCCH format of FIG. 22. However, there is a difference in that, when a generated signal is mapped to a frequency domain, the signal is mapped in an interleaved manner or a localized manner. To facilitate the explanation of FIG. 27 and FIG. 28, the following description will be based on a normal CP structure of a PUCCH format 1 for carrying ACK/NACK. In addition, the extended PUCCH format is also applicable to PUCCH formats 2/2a/2b for transmission of UCI such as CQI/PMI/RI. That is, the extended PUCCH format is applicable to any control information. For example, it is possible to use the extended PUCCH format proposed to support a 13 (or higher)-bit payload in the PUCCH format 2 supporting up to a 13-bit payload.

Referring to FIG. 27 and FIG. 28, channel coding is performed on an information bit (e.g., ACK/NACK, etc.) for each component carrier (steps 200 and 210). The channel coding may be any one of various types of coding schemes, such as simple repetition, simplex coding, RM coding, punctured RM coding, TBCC, LDPC coding, or turbo coding. An encoding information bit generated as a result of channel coding can be rate-matched by considering a modulation symbol order to be applied and a resource to be mapped. Since the present embodiment applies a QPSK modulation scheme and performs mapping to each of two slots through 6 subcarriers in one PRB consisting of 12 subcarriers, 24 encoding bits can be generated. For ICI randomization for the generated encoding information bit, cell-specific scrambling using a scrambling code corresponding to a cell ID or UE-specific scrambling using a scrambling code corresponding to a UE ID (e.g., a radio network temporary identifier (RNTI)) can be used.

The encoding information bit is modulated via a modulator (steps 201 and 211). Since the present embodiment applies the QPSK modulation scheme, 12 QPSK symbols are generated. The QPSK symbols are distributed to each slot via a divider (steps 202 and 212). The QPSK symbols can be distributed to two slots in various manners. For example, a first part of the QPSK symbol can be distributed to a first slot, and a last part of the QPSK symbol can be distributed to a second slot. Alternatively, by using an interleaving scheme, an even QPSK symbol of an encoding information bit can be distributed to the first slot, and an odd QPSK symbol of the encoding information bit can be distributed to the second slot. Meanwhile, the modulator and the divider may be placed in a reverse order.

DFT precoding for generating a single-carrier waveform in each slot is performed on the QPSK symbols distributed to each slot via the divider (steps 203 and 213). Since 6 QPSK symbols are distributed to each slot in the present embodiment, 6-point DFT precoding is performed. In addition to the DFT precoding, an operation of Walsh precoding or the like corresponding thereto can be performed. However, it is assumed hereinafter that the DFT precoding is performed unless specified otherwise.

Time spreading is performed with an SC-FDMA symbol level on QPSK symbols for which DFT precoding is performed, by using an orthogonal code having an index m which is predetermined or determined through dynamic signaling or RRC signaling (steps 204 and 214). The orthogonal code of the index m can be expressed by $w_m=[w_0\ w_1\ w_2\ w_3]$ if a spreading factor (SF) is 4. If the orthogonal code is a Walsh code and the SF is 4, it can be expressed by $w_0=[1\ 1\ 1\ 1]$, $w_1=[1\ -1\ 1\ -1]$, $w_2=[1\ 1\ -1\ -1]$, $w_3=[1\ -1\ -1\ 1]$. If the orthogonal code is a DFT code, it can be expressed by $w_m=[w_0\ w_1\ \ldots\ w_{k-1}]$, where $w_k=\exp(j2\pi km/SF)$. In addition, another code other than the Walsh code and the DFT code may be used as the orthogonal code. The SF may vary depending on a system, and may be predetermined or may be reported to the UE through DCI or RRC signaling. In addition, the orthogonal code applied with the SC-FDMA symbol level can be hopped in the slot level.

A signal generated as described above is mapped to a subcarrier in a PRB. In FIG. 27, an SC-FDMA signal is mapped to a subcarrier in an interleaved manner. That is, when the SC-FDMA signal is mapped to the subcarrier, the SC-FDMA signal is mapped with a specific interval. Although it is shown in FIG. 27 that the SC-FDMA signal is mapped with an interval of 2 subcarriers, the SC-FDMA signal can be mapped in various intervals, for example, 3 or 4 or 6 subcarriers. In FIG. 28, an SC-FDMA signal is mapped to a subcarrier in a localized manner. That is, the SC-FDMA signal is continuously mapped to some subcarriers in a PRB. Although it is shown in FIG. 28 that the SC-FDMA signal is mapped to first 6 subcarriers in the PRB, the present invention is not limited thereto.

The SC-FDMA signal mapped to the subcarrier is converted into a signal of a time domain by IFFT, and is transmitted via an RF unit by attaching a CP. If SF=4, 12-bit information can be transmitted with a coding rate of 0.0625 (=12/24/4), and 8 UEs can be multiplexed per one PRB. In addition, when the SC-FDMA symbol is mapped to the subcarrier in an interleaved manner, 12 UEs can be multiplexed if mapping is performed with an interval of 3 subcarriers, and 16 or 24 UEs can be multiplexed when mapping is performed with intervals of 4 or 6 subcarriers, respectively. That is, the number of UEs that can be multiplexed can be determined by regulating an interval of subcarriers to be mapped.

Meanwhile, similarly to LTE rel-8, a DFT code of SF=3 and a cyclic shift can be applied to a reference signal. If SF=4, [1 1 −1 −1] is not used in the Walsh code since it is restricted by SF=3, but it can also be used. In addition, when a specific SC-FDMA symbol of the data part is punctured by a sounding reference signal (SRS) or the like, a spreading code of SF=3 can be applied to a corresponding slot.

Figure 29:
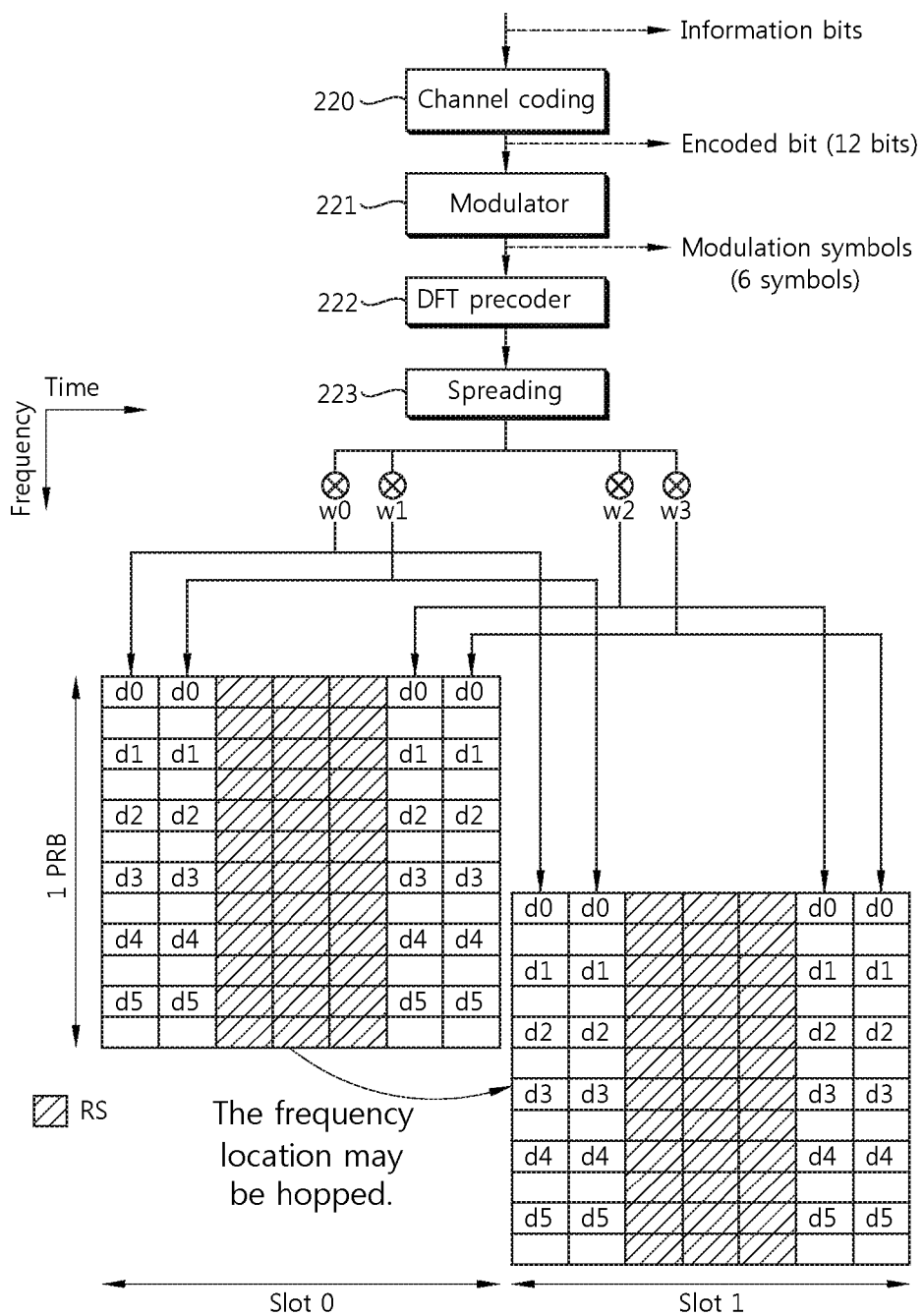
Figure 30:
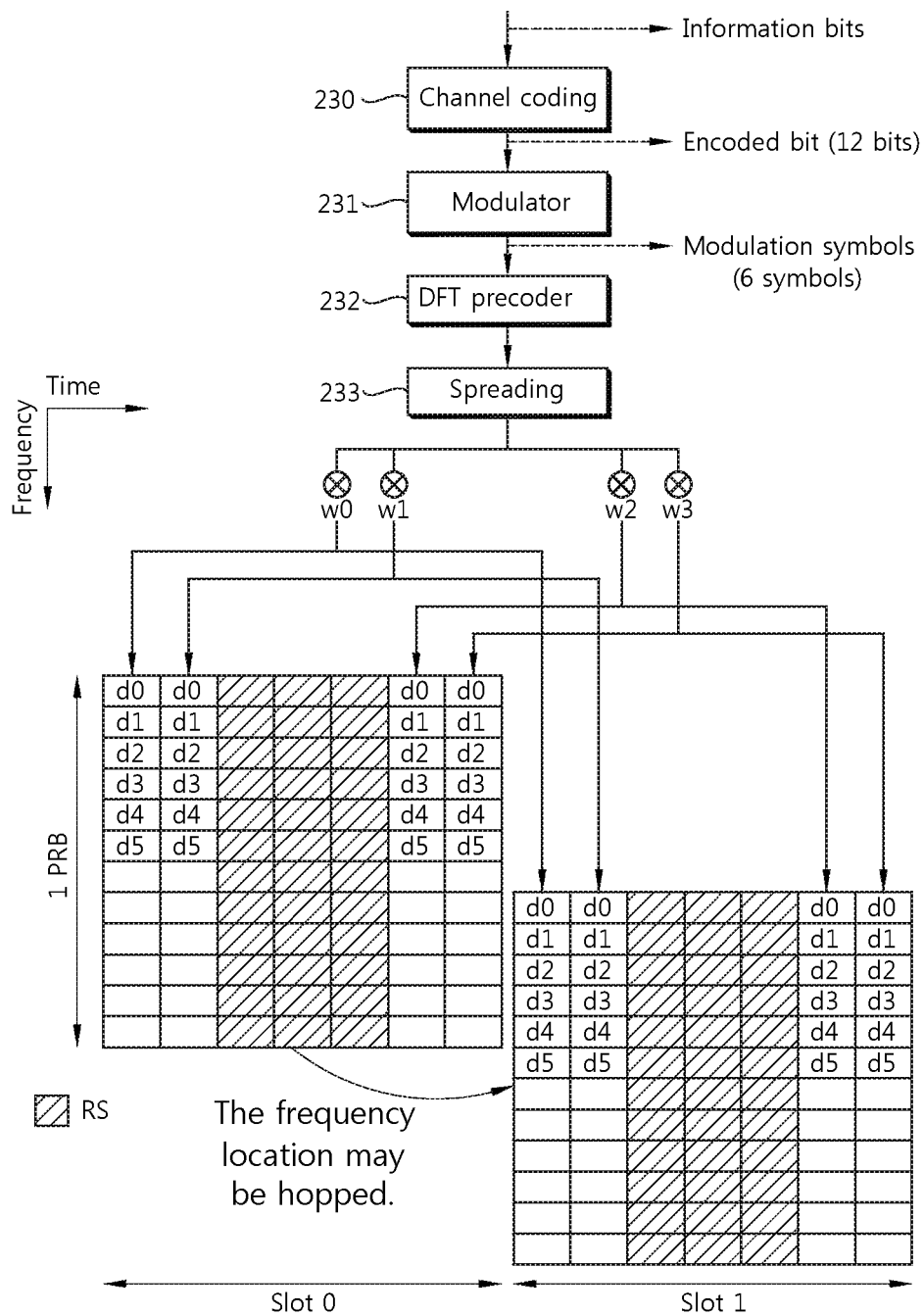

FIG. 29 and FIG. 30 are another example of an extended PUCCH format. The extended PUCCH format of FIG. 29 and FIG. 30 is a case where one slot in a subframe is repeated in another slot and separate coding is performed on the two slots. That is, it has a similar structure as the extended PUCCH format of FIG. 23. However, there is a difference in that, when a generated signal is mapped to a frequency domain, the signal is mapped in an interleaved manner or a localized manner.

Referring to FIG. 29 and FIG. 30, channel coding is performed on an information bit such as ACK/NACK for each component carrier (steps 220 and 230). The encoding information bit is modulated via a modulator (steps 221 and 231). Since the present embodiment applies the QPSK modulation scheme, 6 QPSK symbols are generated. DFT precoding is performed on QPSK symbols (steps 222 and 232), and time spreading can be performed with an SC-FDMA symbol level by using an orthogonal code (steps 223 and 233). The orthogonal code can be hopped in the slot level. The generated SC-FDMA signal is mapped to a subcarrier in a PRB. In FIG. 29, the SC-FDMA signal is mapped to the subcarrier in an interleaved manner. In FIG. 30, the SC-FDMA signal is mapped to the subcarrier in a localized manner.

In the extended PUCCH format of FIG. 29 and FIG. 30, an SR transmission event and an ACK/NACK transmission event can also occur in the same subframe or the same slot. In this case, this problem can be solved by applying the aforementioned method.

1) Joint Coding of SR and ACK/NACK

An information bit related to the SR can be embedded to the ACK/NACK and then transmitted by performing joint coding. A case where the 1-bit SR information bit is transmitted by being embedded to the ACK/NACK can be explained by the extended PUCCH format of FIG. 29. When assuming 5 DL CCs, 12 bits for ACK/NACK transmission and 1 bit for SR transmission, that is, 13-bit information is channel-coded to generate a 24-bit encoding information bit, and QPSK modulation is performed thereon and a generated QPSK symbol is mapped. In this case, if the 1-bit SR information bit is 0, it may indicate that there is no SR transmission event, and if the 1-bit SR information bit is 1, it may indicate that the SR transmission event exists. Alternatively, on the contrary, if the SR information bit is 0, it may indicate that the SR transmission event exist, and if the SR information bit is 1, it may indicate that there is no SR transmission event.

2) ACK/NACK Bundling

In a case where the SR transmission event and the ACK/NACK transmission event simultaneously occur, ACK/NACKs for multiple DL CCs can be bundled and transmitted. A bundled representative ACK/NACK can be transmitted by using a resource allocated for an SR. In this case, ACK/NACKs for multiple DL CCs can be bundled by a logical AND operation. That is, if ACK/NACK information for all DL CCs is ACK, a representative ACK/NACK can carry the ACK. If ACK/NACK information for at least one CC is NACK, the representative ACK/NACK can carry the NACK. In addition, if ACK/NACK information for at least one CC is in a DTX state, the representative ACK/NACK can carry DRX.

The extended PUCCH format of FIG. 27 to FIG. 30 can be transmitted through two transmit antennas. Accordingly, a transmit diversity can be acquired. To facilitate explanation, an orthogonal resource used for transmission of a data part is called a $1^{st}$ orthogonal resource, and an orthogonal resource used for transmission of a reference signal part is called a $2^{nd}$ orthogonal resource. Logical indices of the $1^{st}$ orthogonal resource and the $2^{nd}$ orthogonal resource can be linked to each other. For example, if a logical index of the $2^{nd}$ orthogonal resource is given, a logical index of the $1^{st}$ orthogonal resource can be automatically given. In addition, a physical configuration method of the logical indices of the $1^{st}$ orthogonal resource and the $2^{nd}$ orthogonal resource may be different from each other.

When the extended PUCCH format is transmitted through two transmit antennas, two 1$^{st}$ orthogonal resources can be selected based on one PRB, and then can be transmitted through the respective antennas. The 1$^{st}$ orthogonal resource may be a combination of an orthogonal code and a frequency factor. The frequency factor may be given to $N_{sc}/N_{freq}$. $N_{sc}$ denotes the number of subcarriers in a PRB, and $N_{freq}$ denotes the number of subcarriers defined with one frequency resource in the PRB. A data part can be transmitted by selecting a different 1$^{st}$ orthogonal code for each antenna. The different orthogonal code may be a DFT code or Walsh code of a different index. A reference signal part can be transmitted through two orthogonal resources in which cyclic shift and OCC are combined. In addition, when the extended PUCCH format is transmitted through the two transmit antennas, it can be transmitted through each antenna on the basis of a different PRB. Since transmission is performed based on the different PRB, there is no restriction on the 1$^{st}$ orthogonal resource applied to the data part or the 2$^{nd}$ orthogonal resource applied to the reference signal part. In this case, two 1$^{st}$ orthogonal resources of the data part and two 2$^{nd}$ orthogonal resources of the reference signal part may be predetermined or may be given through a PDCCH or RRC signaling. The orthogonal code of the data part and the orthogonal resource of the reference signal part can be individually signaled, or if an orthogonal code or orthogonal resource for any one of the antennas is signaled, an orthogonal code or orthogonal resource for the other antenna can be derived from the signaling.

Meanwhile, the aforementioned extended PUCCH format can be transmitted simultaneously with an SRS. The SRS can be transmitted by occupying a last SC-FDMA symbol of a subframe in which the extended PUCCH format is transmitted. That is, the last SC-FDMA symbol of the extended PUCCH format is punctured. In this case, an OCC length applied to a data part of the extended PUCCH format can be regulated according to the number of SC-FDMA symbols to be punctured. Alternatively, when transmitting ACK/NACK having the extended PUCCH format, the SRS is not transmitted according to a high priority of the ACK/NACK. That is, when the ACK/NACK and the SRS must be transmitted in the same subframe, a UE does not change the extended PUCCH format and does not transmit the SRS. It is assumed hereinafter that the ACK/NACK is transmitted through the extended PUCCH format. However, the present invention is not limited thereto, and thus UCI (i.e., CQI, PMI, RI, etc.) can be transmitted through the extended PUCCH format.

Figure 31:
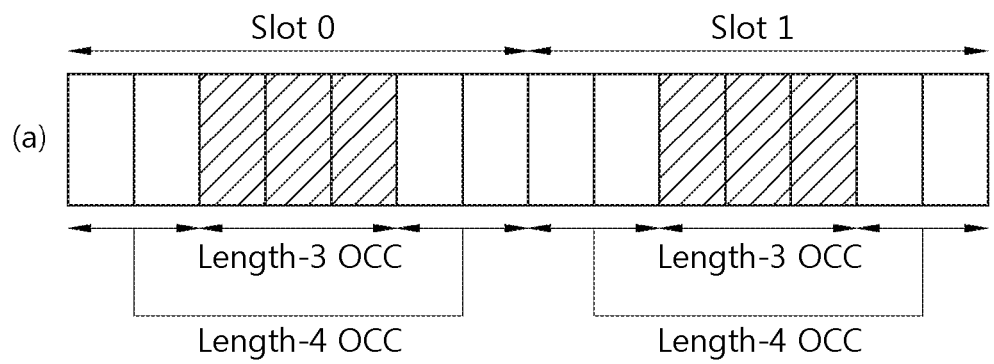
FIG. 31 to FIG. 33 show example of a subframe configuration according to the proposed UCI transmission method.
Figure 31:
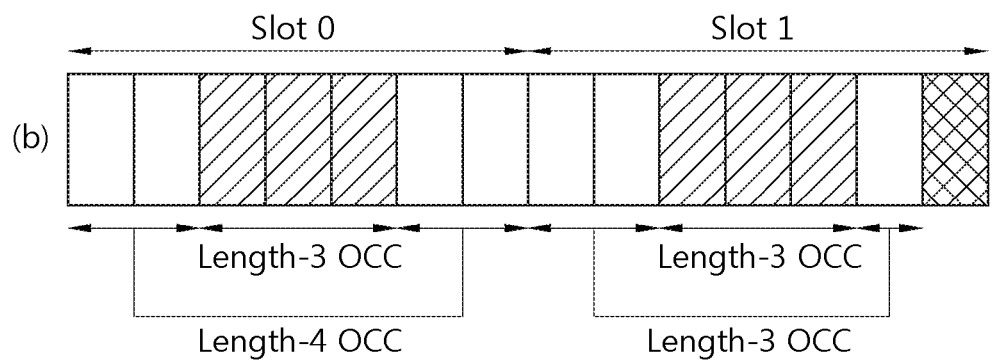
Figure 31:
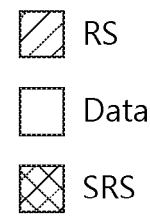

FIG. 31 shows an example of a subframe configuration according to the proposed UCI transmission method.

FIG. 31(a) is an example of a subframe configuration having a typical extended PUCCH format. Three SC-FDMA symbols per slot are allocated for a reference signal. Although it is assumed in FIG. 31(a) that 3$^{rd}$ to 5$^{th}$ OFDM symbols of each slot are allocated for a usage of the reference signal, the present invention is not limited thereto. A reference signal SC-FDMA symbol is spread based on length-3 OCC. The OCC applied to the reference signal SC-FDMA symbol may be a DFT code. The remaining 4 data SC-FDMA symbols are spread based on length-4 OCC. The OCC applied to the data SC-FDMA symbol may be a Walsh code. In addition, hopping can be performed between slots.

FIG. 31(b) is an example of a subframe configuration having a punctured extended PUCCH format. That is, in order to transmit the extended PUCCH format and an SRS in the same subframe, a last SC-FDMA symbol of a subframe in which the extended PUCCH format is transmitted is punctured. A last SC-FDMA symbol of a 2$^{nd}$ slot (i.e., a slot 1) is punctured for SRS transmission. The remaining 3 data SC-FDMA symbols of the 2$^{nd}$ slot (i.e., the slot 1) are spread based on length-3 OCC. In this case, the punctured extended PUCCH format can be configured through higher layer signaling, and can be used through bundling with higher layer signaling for PUCCH formats 1/1a/1b in LTE rel-8 and thus can be defined without a signaling overhead.

Figure 32:
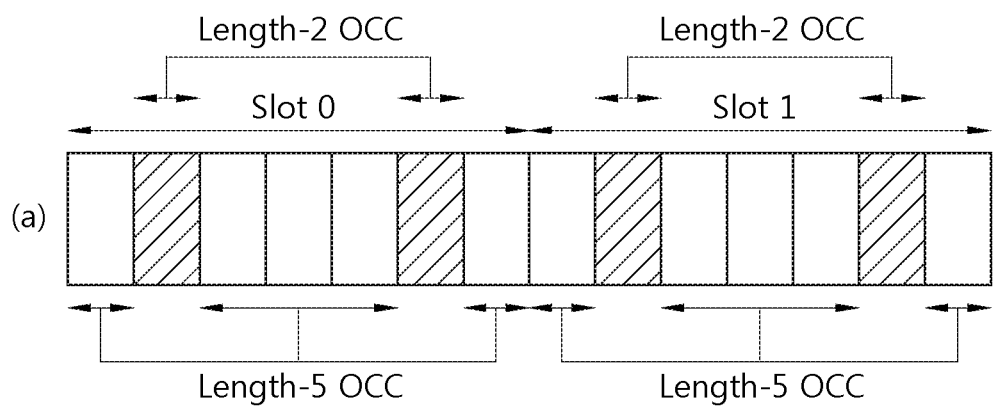
Figure 32:
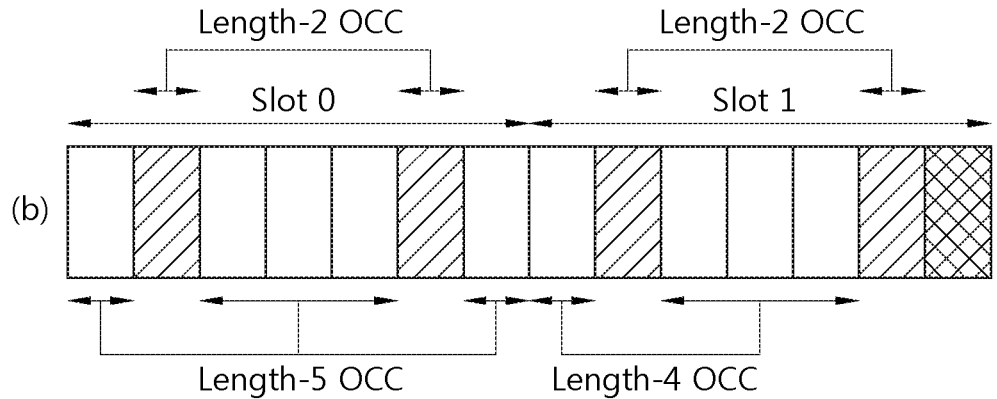
Figure 32:
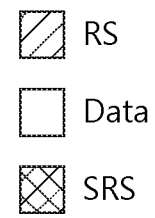

FIG. 32 is another example of a subframe configuration according to the proposed UCI transmission method.

FIG. 32(a) is an example of a subframe configuration having a typical extended PUCCH format. Two SC-FDMA symbols per slot are allocated for a reference signal. Although it is assumed in FIG. 32(a) that 2$^{nd}$ and 6$^{th}$ SC-FDMA symbols of each slot are allocated for a usage of the reference signal, the present invention is not limited thereto. A reference signal SC-FDMA symbols is spread based on length-2 OCC. The OCC applied to the reference signal SC-FDMA symbol may be a DFT code. The remaining 5 data SC-FDMA symbols are spread based on length-5 OCC. The OCC applied to the data SC-FDMA symbol may be a Walsh code. In addition, hopping can be performed between slots.

FIG. 32(b) is an example of a subframe configuration having a punctured extended PUCCH format. A last SC-FDMA symbol of a 2$^{nd}$ slot (i.e., a slot 1) is punctured for SRS transmission. The remaining 4 data SC-FDMA symbols of the 2$^{nd}$ slot (i.e., the slot 1) are spread based on the length-4 OCC. In this case, the punctured extended PUCCH format can be configured through higher layer signaling, and can be used through bundling with higher layer signaling for PUCCH formats 1/1a/1b in LTE rel-8 and thus can be defined without a signaling overhead.

Figure 33:
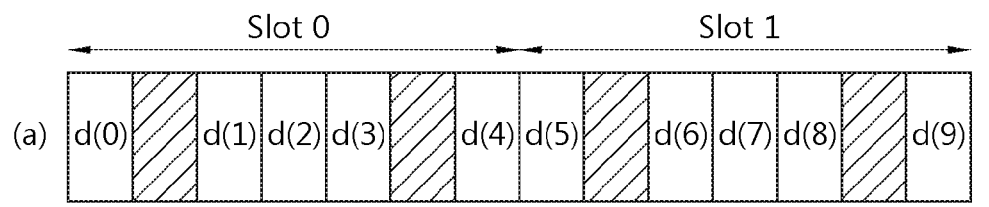
Figure 33:
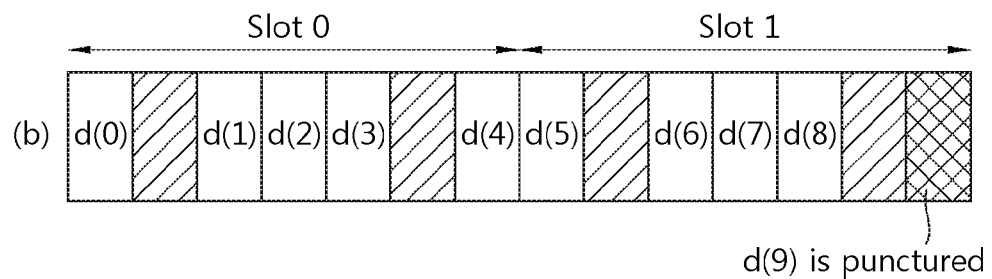

FIG. 33 is another example of a subframe configuration according to the proposed UCI transmission method. FIG. 33(a) is an example of a subframe configuration when transmitting an ACK/NACK channel-coded through a PUCCH format 2. Two SC-FDMA symbols per slot are allocated for a reference signal. Although it is assumed in FIG. 33(a) that 2$^{nd}$ and 6$^{th}$ SC-FDMA symbols of each slot are allocated for a usage of the reference signal, the present invention is not limited thereto.

FIG. 33(b) is an example of a subframe configuration when transmitting an SRS and an ACK/NACK which are channel-coded through a punctured PUCCH format 2. In comparison with FIG. 33(a), a last SC-FDMA symbol d(9) of a 2$^{nd}$ slot (i.e., a slot 1) is punctured, and the SRS is transmitted through d(9). In case of using a QPSK modulation scheme, the puncturing of the last SC-FDMA symbol is actually equivalent to puncturing of last 2 bits which are channel-coded. In this case, the punctured PUCCH format 2 can be configured through higher layer signaling, and can be used through bundling with higher layer signaling for PUCCH formats 1/1a/1b in LTE rel-8 and thus can be defined without a signaling overhead.

Figure 34:
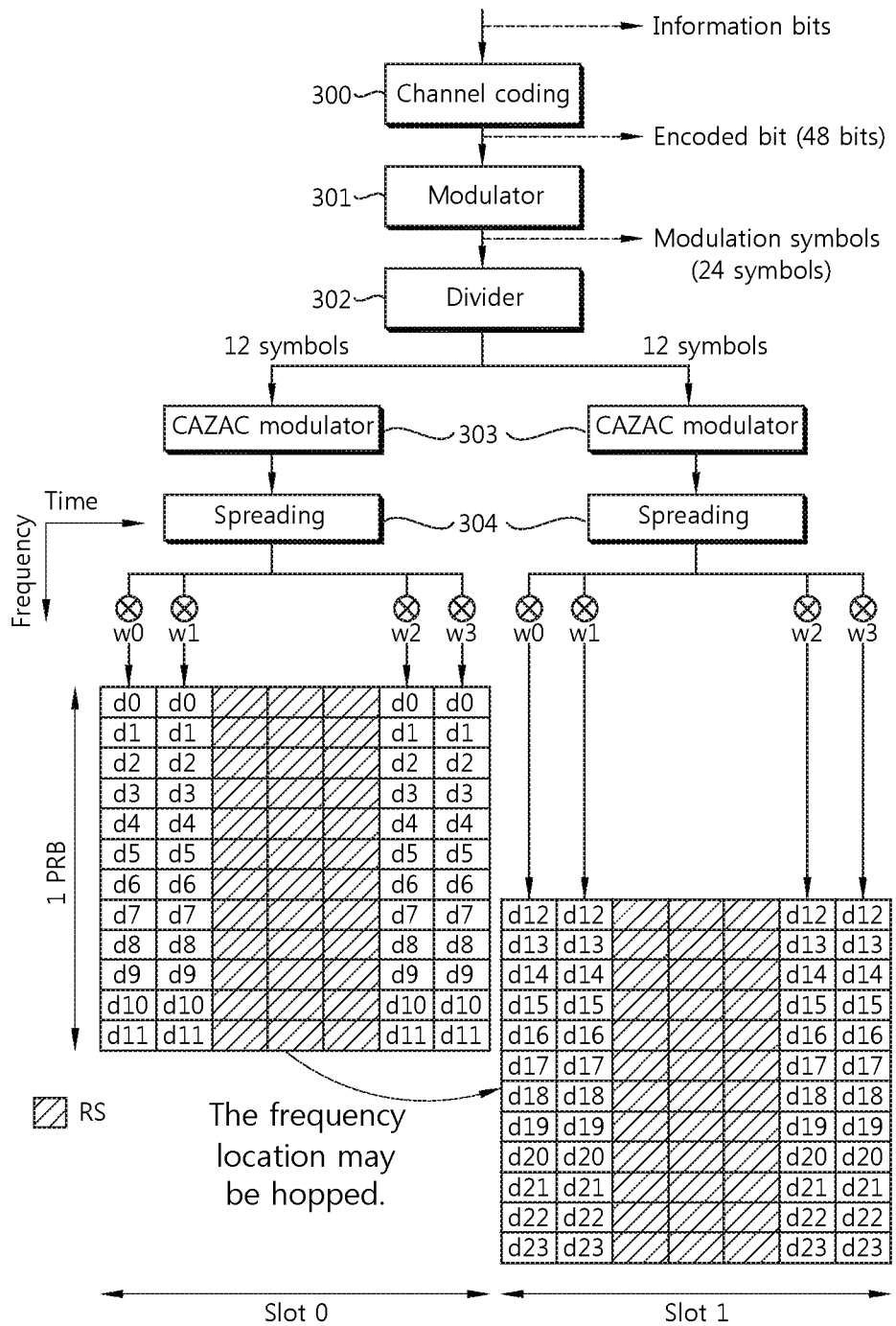
FIG. 34 is another example of an extended PUCCH format.

FIG. 34 is another example of an extended PUCCH format. The extended PUCCH format of FIG. 34 is a case where joint coding is performed on two slots in a subframe. That is, it has a similar structure as the extended PUCCH format of FIG. 22. However, DFT precoding (step 103) is performed in FIG. 22, whereas CAZAC modulation (step 303) is performed in FIG. 34. A symbol subjected to PSK or QAM modulation through CAZAC modulation is modulated one more time by a CAZAC sequence or an LTE rel-8 CG-CAZAC sequence. If the LTE rel-8 CG-CAZAC sequence is $\{r_0, r_1, \ldots, r_{L/2-1}\}$, a sequence subjected to CAZAC modulation may be $d_n = c_n * r_n$ or $d_n = \text{conj}(c_n) * r_n$.

Since the CAZAC sequence or LTE rel-8 CG-CAZAC sequence used in FIG. 34 is a cell-specific sequence, a cell-specific scrambling code may not be used. In addition, for ICI randomization, only a UE-specific scrambling code can be used. Meanwhile, the extended PUCCH format of FIG. 34 can be applied to a case where one slot in a subframe is repeated in another slot and separate coding is performed on the two slots.

Figure 35:
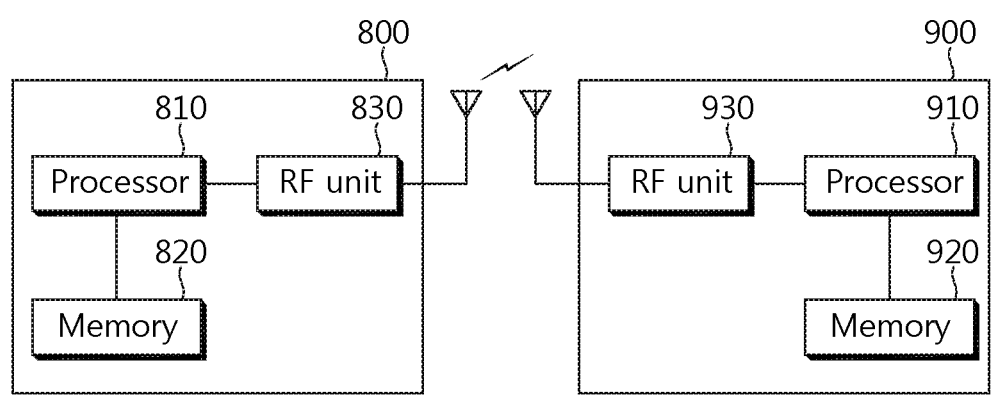
FIG. 35 is a block diagram showing a BS and a UE according to an embodiment of the present invention.

FIG. 35 is a block diagram showing a BS and a UE according to an embodiment of the present invention.

A BS 800 includes a processor 810, a memory 820, and a radio frequency (RF) unit 830. The processor 810 implements the proposed functions, procedures, and/or methods. Layers of a radio interface protocol can be implemented by the processor 810. The memory 820 coupled to the processor 810 stores a variety of information for driving the processor 810. The RF unit 830 coupled to the processor 810 transmits and/or receives a radio signal.

A UE 900 includes a processor 910, a memory 920, and an RF unit 930. The processor 910 implements the proposed functions, procedures, and/or methods. Layers of a radio interface protocol can be implemented by the processor 910. The processor 910 performs channel coding on information bits of UCI to generate encoding information bits, modulates the generated encoding information bits to generate complex-valued modulation symbols, and block-wise spreads the complex-valued modulation symbols to multiple SC-FDMA symbols on the basis of an orthogonal sequence. The memory 920 coupled to the processor 910 stores a variety of information for driving the processor 910. The RF unit 930 coupled to the processor 910 transmits and/or receives a radio signal. Further, the RF unit 930 transmits the spread complex-valued modulation symbols to the BS.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a user equipment (UE), uplink control information (UCI) on a physical uplink control channel (PUCCH) in a wireless communication system, the method comprising:
   receiving a scheduling request (SR) configuration from a base station;
   generating UCI information bits comprising an SR bit and hybrid automatic repeat request acknowledgement (HARQ-ACK) information bits for a plurality of component carriers (CCs),
   wherein the SR bit is located at the end of the UCI information bits;
   performing channel coding on information bits of the UCI to generate encoded information bits;
   generating modulation symbols by modulating the encoded information bits;
   spreading the modulation symbols with an orthogonal code; and
   transmitting the spread modulation symbols to the base station on a physical uplink control channel (PUCCH).

2. The method of claim 1, wherein the HARQ-ACK information bits for a plurality of CCs include concatenation of HARQ-ACK information bits for each of the plurality of CCs.

3. The method of claim 1, wherein a number of the HARQ-ACK information bits for each of the plurality of CCs is 1 bit, when a transmission mode of each of the plurality of CCs is a single codeword transmission mode.

4. The method of claim 1, wherein a number of the HARQ-ACK information bits for each of the plurality of CCs is 2 bits, when a transmission mode of each of the plurality of CCs is not a single codeword transmission mode.

5. The method of claim 4,
   wherein one of the HARQ-ACK information bits for each of the plurality of CCs corresponds to an HARQ-ACK information bit for a first codeword, and
   wherein a remaining bit of the HARQ-ACK information bits for each of the plurality of CCs corresponds to an HARQ-ACK information bit for a second codeword.

6. The method of claim 1, wherein the SR bit is 1 bit.

7. The method of claim 6,
   wherein if a value of the SR bit is 1, it indicates a presence of an SR transmission event, and
   wherein if a value of the SR bit is 0, it indicates an absence of the SR transmission event.

8. A user equipment (UE) in a wireless communication system, the UE comprising:
   a radio frequency (RF) unit; and
   a processor, coupled to the RF unit, that:
      receives a scheduling request (SR) configuration from a base station;
      generates UCI information bits comprising an SR bit and hybrid automatic repeat request acknowledgement (HARQ-ACK) information bits for a plurality of component carriers (CCs),
      wherein the SR bit is located at the end of the UCI information bits;
      performs channel coding on the UCI information bits to generate encoded information bits;

generates modulation symbols by modulating the encoded information bits;

spreads the modulation symbols with an orthogonal code; and controls the RF unit to transmit the spread modulation symbols to the base station on a physical uplink control channel (PUCCH).

9. The UE of claim 8, wherein the HARQ-ACK information bits for a plurality of CCs include concatenation of HARQ-ACK information bits for each of the plurality of CCs.

10. The UE of claim 8, wherein a number of the HARQ-ACK information bits for each of the plurality of CCs is 1 bit, when a transmission mode of each of the plurality of CCs is a single codeword transmission mode.

11. The UE of claim 8, wherein a number of the HARQ-ACK information bits for each of the plurality of CCs is 2 bits, when a transmission mode of each of the plurality of CCs is not a single codeword transmission mode.

12. The UE of claim 11, wherein one of the HARQ-ACK information bits for each of the plurality of CCs corresponds to an HARQ-ACK information bit for a first codeword, and wherein a remaining bit of the HARQ-ACK information bits for each of the plurality of CCs corresponds to an HARQ-ACK information bit for a second codeword.

13. The UE of claim 8, wherein the SR bit is 1 bit.

14. The UE of claim 13, wherein if a value of the SR bit is 1, it indicates a presence of an SR transmission event, and wherein if a value of the SR bit is 0, it indicates an absence of the SR transmission event.

* * * * *